(12) United States Patent
Tsuji et al.

(10) Patent No.: US 11,813,668 B2
(45) Date of Patent: Nov. 14, 2023

(54) DIE CASTING MACHINE

(71) Applicant: SHIBAURA MACHINE CO., LTD., Tokyo (JP)

(72) Inventors: Makoto Tsuji, Kanagawa (JP); Yuto Hayashi, Kanagawa (JP); Saburo Noda, Kanagawa (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 0 days.

(21) Appl. No.: 17/574,153

(22) Filed: Jan. 12, 2022

(65) Prior Publication Data

US 2022/0134417 A1 May 5, 2022

Related U.S. Application Data

(63) Continuation of application No. PCT/JP2020/018083, filed on Apr. 28, 2020.

(30) Foreign Application Priority Data

Jul. 24, 2019 (JP) .................................. 2019-136121

(51) Int. Cl.
*B22D 17/32* (2006.01)
*B22D 17/20* (2006.01)
*B29C 45/53* (2006.01)

(52) U.S. Cl.
CPC ........... *B22D 17/32* (2013.01); *B22D 17/203* (2013.01); *B29C 45/53* (2013.01)

(58) Field of Classification Search
CPC ....... B22D 17/20; B22D 17/203; B22D 17/32

(Continued)

(56) References Cited

U.S. PATENT DOCUMENTS 4,884,621 A * 12/1989 Ban et al. .............. B22D 17/32
164/319
5,566,743 A * 10/1996 Guergov ................ B22D 17/32
164/113

(Continued)

FOREIGN PATENT DOCUMENTS

JP    S51-129817 A    11/1976
JP    S59-156560 A    9/1984

(Continued)

OTHER PUBLICATIONS

Chinese Office Action in Application No. 202080052229.3, dated Dec. 28, 2022.

(Continued)

*Primary Examiner* — Kevin P Kerns
(74) *Attorney, Agent, or Firm* — DLA Piper LLP (US)

(57) ABSTRACT

A die casting machine of an embodiment includes: a base; a fixed die plate fixed onto the base and holding a fixed die; a movable die plate provided on the base to be movable in a mold opening and closing direction and holding a movable die to face the fixed die; an injection device filling a molten metal into a cavity formed by the fixed die and the movable die and applying a first pressure to the molten metal; a first pressurizing device pressurizing the molten metal filled in the cavity in a region other than a product region of the cavity and applying a second pressure to the molten metal; and a control device controlling the first pressurizing device so that the second pressure becomes higher than the first pressure.

12 Claims, 12 Drawing Sheets

(58) Field of Classification Search
USPC ....... 164/284, 303, 312, 314, 113, 120, 319, 164/151, 155.3, 154.8
See application file for complete search history.

(56) References Cited

U.S. PATENT DOCUMENTS

| | | | | |
|---|---|---|---|---|
| 5,787,959 | A | * | 8/1998 | Laxmanan et al. .. B22D 17/007 164/113 |
| 7,290,585 | B2 | * | 11/2007 | Takeya et al. ......... B22D 17/00 164/113 |
| 2009/0242161 | A1 | | 10/2009 | Uchida et al. |

FOREIGN PATENT DOCUMENTS

| | | |
|---|---|---|
| JP | H01107953 | 4/1989 |
| JP | H04-123856 | 4/1992 |
| JP | H07-185773 A | 7/1995 |
| JP | H08-132211 A | 5/1996 |
| JP | H09-225619 A | 9/1997 |
| JP | H10-024357 A | 1/1998 |
| JP | 2000-167893 A | 6/2000 |
| JP | 2004-195880 A | 7/2004 |
| JP | 2004-255430 A | 9/2004 |
| JP | 2004-344963 A | 12/2004 |
| JP | 2012-011395 A | 1/2012 |
| JP | 5424626 | 2/2014 |
| JP | 2015-163411 A | 9/2015 |
| JP | 2018-149550 A | 9/2018 |
| KR | 10-0992723 | 11/2010 |

OTHER PUBLICATIONS

India Office Action in Application 202117006108, dated May 5, 2022.
International Preliminary Report on Patentability in PCT/JP2020/018083 dated Jan. 25, 2022.
Japanese Office Action issued in JP 2019-136121 dated Dec. 3, 2019.
Internation Search Report in PCT/JP2020/018083 dated Jul. 28, 2020.
Written Opeinion of ISR in PCT/JP2020/018083 dated Jul. 28, 2020.
Chinese Office Action in Application No. 202080052229.3, dated Aug. 3, 2023.
Yun Chorin "Die Casting Molding Technology and Die Design and Practice"; Jan. 1, 2017; Super Star Reading Shu Academic; pp. 264-265.

* cited by examiner

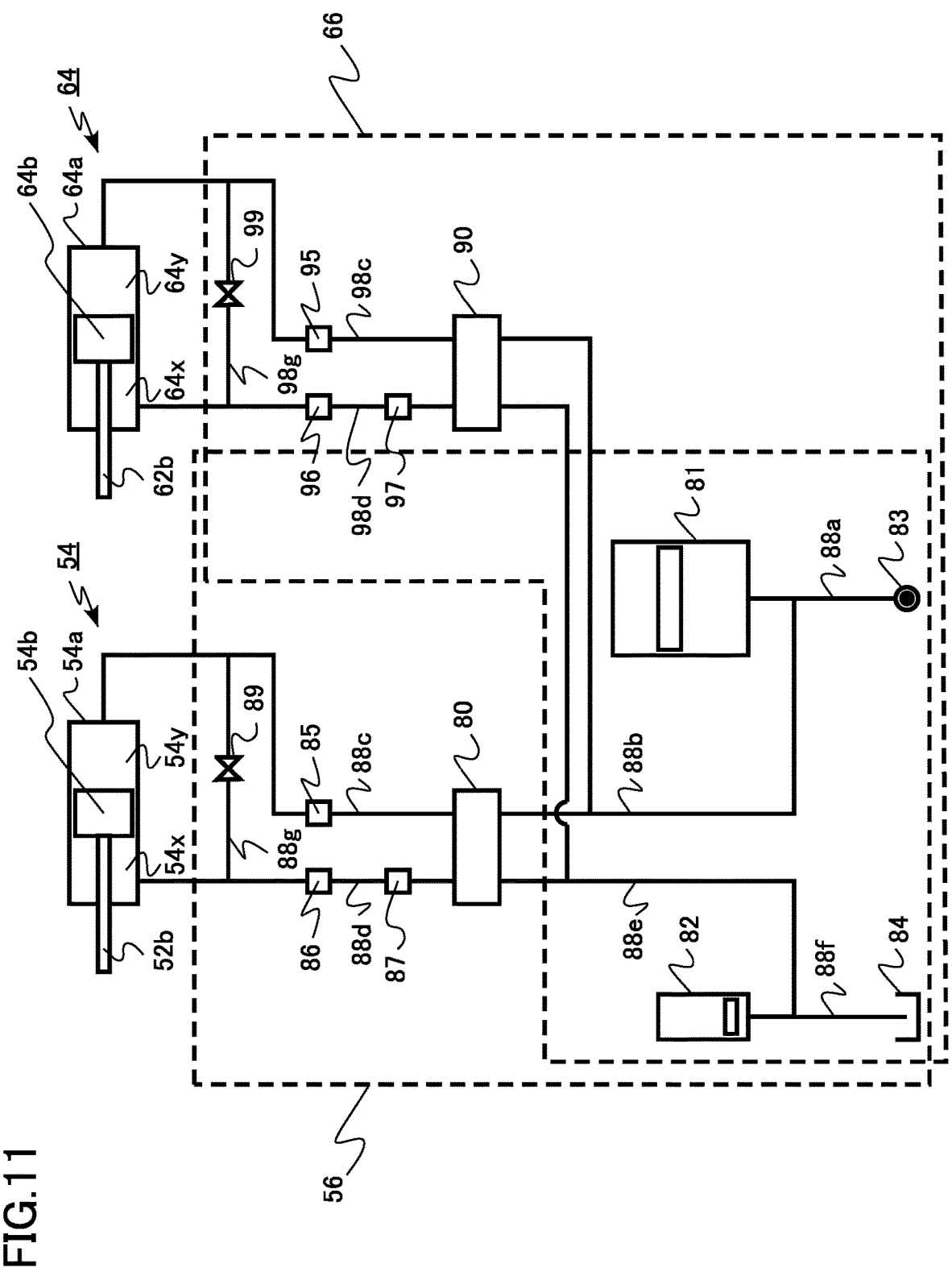

DIE CASTING MACHINE

CROSS-REFERENCE TO RELATED APPLICATION

This application is continuation application of, and claims the benefit of priority from the International Application PCT/JP2020/18038, filed Apr. 28, 2020, which claims the benefit of priority from Japanese Patent Application No. 2019-136121, filed on Jul. 24, 2019, the entire contents of all of which are incorporated herein by reference.

FIELD OF THE INVENTION

The present invention relates to a die casting machine which manufactures a molded product by filling a molten metal into a cavity in a mold using an injection device.

BACKGROUND OF THE INVENTION

A die casting machine manufactures a molded product (die-cast product) by filling a molten metal into a cavity in a mold clamped by a mold clamping device using an injection device. It is desired for the die casting machine to decrease a casting pressure applied to the molten metal when manufacturing the molded product. Since the casting pressure decreases, the capacity required for a mold clamping device and an injection device can be decreased and the manufacturing cost of the die casting machine can be decreased.

Patent Document 1 describes a die casting machine which detects a variation in pressure in an increasing state for a hydraulic pressure in a mold clamping cylinder, controls a filling pressure into a mold cavity by a pressurizing pin, and prevents an excessive pressure while supplying metal in accordance with a solidification contraction speed. However, in the die casting machine described in JP 10-24357 A, it is difficult to largely decrease a casting pressure.

SUMMARY OF THE INVENTION

A die casting machine according to an aspect of the invention includes: a base; a fixed die plate fixed onto the base and holding a fixed die; a movable die plate provided on the base to be movable in a mold opening and closing direction and holding a movable die to face the fixed die; an injection device filling a molten metal into a cavity formed by the fixed die and the movable die and applying a first pressure to the molten metal; a first pressurizing device pressurizing the molten metal filled in the cavity in a region other than a product region of the cavity and applying a second pressure to the molten metal; and a control device controlling the first pressurizing device so that the second pressure becomes higher than the first pressure.

In the die casting machine of the above-described aspect, the injection device may include an injection sleeve connected to the cavity, an injection plunger sliding in the injection sleeve and applying the first pressure to the molten metal, an injection actuator moving the injection plunger, and a first liquid pressure circuit driving the injection actuator, and the first pressurizing device may include a first pressurizing plunger applying the second pressure to the molten metal, a first pressurizing actuator moving the first pressurizing plunger, and a second liquid pressure circuit driving the first pressurizing actuator.

In the die casting machine of the above-described aspect, the first liquid pressure circuit may include a first valve controlling a flow of a first hydraulic liquid flowing in the first liquid pressure circuit and a first accumulator increasing a flow rate of the first hydraulic liquid, and the second liquid pressure circuit may include a second valve controlling a flow of a second hydraulic liquid flowing in the second liquid pressure circuit and a second accumulator increasing a flow rate of the second hydraulic liquid.

In the die casting machine of the above-described aspect, the first liquid pressure circuit may include a first back pressure absorbing cylinder increasing a flow rate of the first hydraulic liquid, and the second liquid pressure circuit may include a second back pressure absorbing cylinder increasing a flow rate of the second hydraulic liquid.

In the die casting machine of the above-described aspect, the first valve and the second valve may be servo valves.

In the die casting machine of the above-described aspect, the second liquid pressure circuit may include a first liquid pressure sensor provided on a pressurization side of the first pressurizing actuator and a second liquid pressure sensor provided on a back pressure side of the first pressurizing actuator, and the control device may control the second pressure based on measurement values of the first liquid pressure sensor and the second liquid pressure sensor.

In the die casting machine of the above-described aspect, the second liquid pressure circuit may include a short-circuit flow path short-circuiting a pressurization side and a back pressure side of the first pressurizing actuator and a degassing valve provided in the short-circuit flow path and extracting a gas contained in the second hydraulic liquid.

In the die casting machine of the above-described aspect, the second liquid pressure circuit may include a flow rate sensor measuring a flow rate of the second hydraulic liquid and the control device may control a speed of the first pressurizing plunger based on a measurement value of the flow rate sensor.

In the die casting machine of the above-described aspect, the first pressurizing actuator may be provided in the fixed die plate and the first pressurizing plunger may be provided in the fixed die.

In the die casting machine of the above-described aspect, the second pressure may be 1.1 times or more and 3 times or less the first pressure.

The die casting machine of the above-described aspect may further include a second pressurizing device pressurizing the molten metal filled into the cavity in a region other than the product region of the cavity and applying a third pressure to the molten metal, and the control device may control the second pressurizing device so that the third pressure becomes higher than the first pressure.

In the die casting machine of the above-described aspect, the second pressurizing device may include a second pressurizing plunger applying the third pressure to the molten metal, a second pressurizing actuator moving the second pressurizing plunger, and a third liquid pressure circuit driving the second pressurizing actuator.

In the die casting machine of the above-described aspect, a distance between the second pressurizing device and the injection device may be smaller than a distance between the first pressurizing device and the injection device, and the control device may control the first pressurizing device and the second pressurizing device so that the second pressure becomes higher than the third pressure.

In the die casting machine of the above-described aspect, the control device may control the first pressurizing device so that the molten metal starts to be pressurized within 10 msec after the filling of the molten metal into the cavity is completed.

BRIEF DESCRIPTION OF THE DRAWINGS

FIG. 11 is a schematic view of a second liquid pressure circuit and a third liquid pressure circuit of the die casting machine of the second embodiment.

DETAILED DESCRIPTION OF THE EMBODIMENTS

Hereinafter, embodiments of the invention will be described with reference to the drawings.

Additionally, in the present specification, a description will be made such that a hydraulic pressure is used as an example of a liquid pressure. For example, a description will be made such that a hydraulic circuit is used as an example of a liquid pressure circuit, a hydraulic actuator is used as an example of a liquid pressure actuator, a hydraulic sensor is used as an example of a liquid pressure sensor, and a hydraulic device is used as an example of a liquid pressure device. Instead of the hydraulic pressure, for example, water pressure can be used. Further, in the present specification, a description will be made such that a hydraulic oil is used as an example of a hydraulic liquid.

First Embodiment

A die casting machine of a first embodiment includes: a base; a fixed die plate fixed onto the base and holding a fixed die; a movable die plate provided on the base to be movable in a mold opening and closing direction and holding a movable die to face the fixed die; an injection device filling a molten metal into a cavity formed by the fixed die and the movable die and applying a first pressure to the molten metal; a first pressurizing device pressurizing the molten metal filled in the cavity in a region other than a product region of the cavity and applying a second pressure to the molten metal; and a control device controlling the first pressurizing device so that the second pressure becomes higher than the first pressure.

Figure 1:
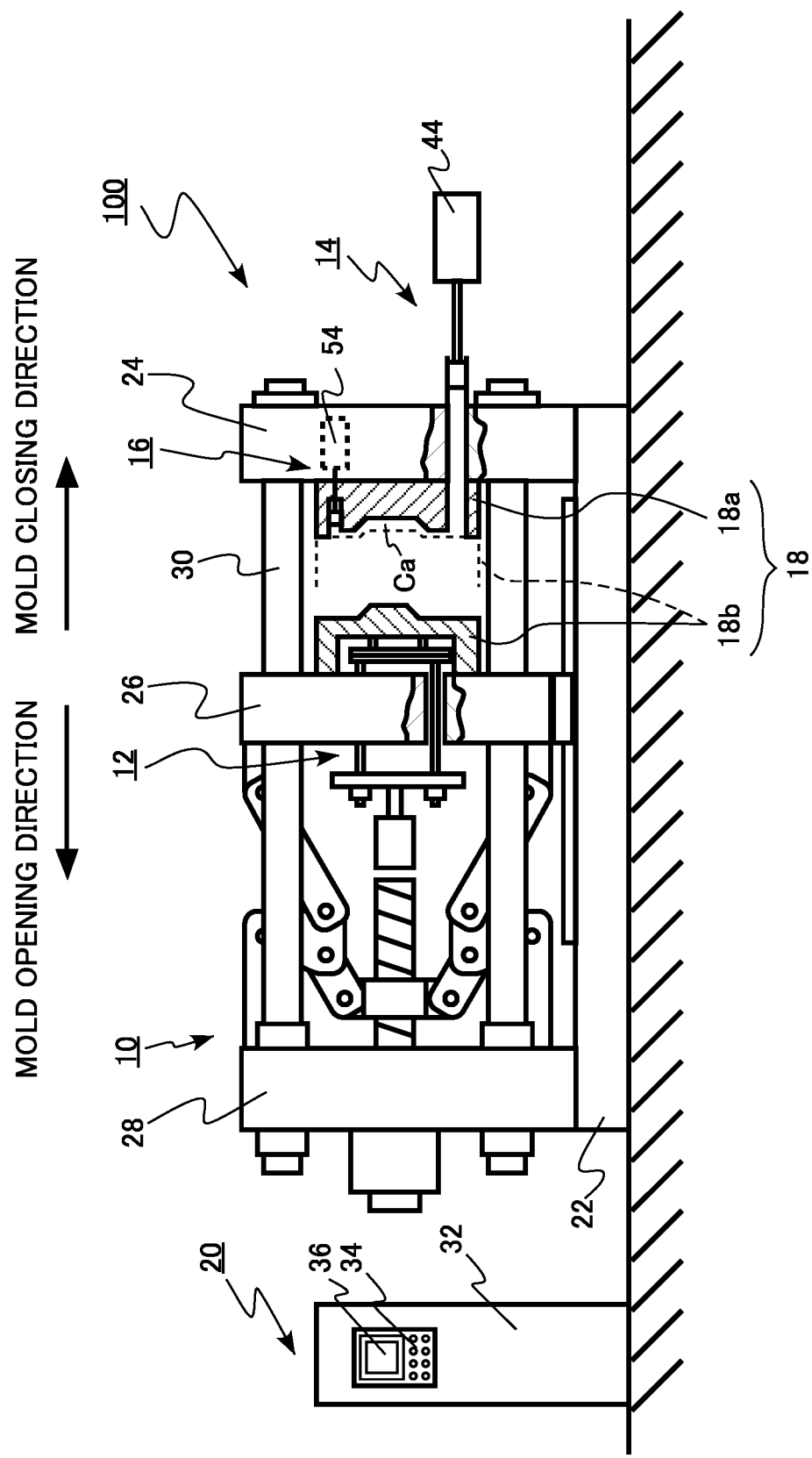
FIG. 1 is a schematic view showing an entire configuration of a die casting machine of a first embodiment.

FIG. 1 is a schematic view showing the entire configuration of the die casting machine of the first embodiment.

FIG. 1 is a side view including a cross-sectional view in part. A die casting machine 100 of the first embodiment is a cold chamber type die casting machine.

The die casting machine 100 includes a mold clamping device 10, an extrusion device 12, an injection device 14, a first pressurizing device 16, a mold 18, and a control unit 20.

The die casting machine 100 includes a base 22, a fixed die plate 24, a movable die plate 26, a link housing 28, and a tie bar 30.

The die casting machine 100 is a machine that manufactures a die-cast product by injecting and filling a liquid metal (molten metal) into a mold 18 (cavity Ca in FIG. 1) and solidifying the liquid metal in the mold 18. The metal is, for example, aluminum, an aluminum alloy, a zinc alloy, or a magnesium alloy.

The mold 18 includes a fixed die 18a and a movable die 18b. The mold 18 is provided between the mold clamping device 10 and the injection device 14.

The fixed die plate 24 is fixed onto the base 22. The fixed die plate 24 can hold the fixed die 18a.

The movable die plate 26 is provided on the base 22 to be movable in the mold opening and closing direction. The mold opening and closing direction means both the mold opening direction and the mold closing direction shown in FIG. 1. The movable die plate 26 can hold the movable die 18b to face the fixed die 18a.

The link housing 28 is provided on a base 22. One end of a link mechanism constituting the mold clamping device 10 is fixed to the link housing 28.

The fixed die plate 24 and the link housing 28 are fixed by a tie bar 30. The tie bar 30 supports a mold clamping force while the mold clamping force is applied to the fixed die 18a and the movable die 18b.

The mold clamping device 10 has a function of opening and closing the mold 18 and clamping the mold.

The injection device 14 has a function of injecting a molten metal into the cavity Ca of the mold 18 and pressurizing the molten metal filled in the cavity Ca. The injection device 14 has a function of applying a first pressure to the molten metal filled in the cavity Ca.

The first pressurizing device 16 has a function of pressurizing the molten metal filled in the cavity Ca of the mold 18 in a region other than a product region of the cavity Ca. The first pressurizing device 16 has a function of applying a second pressure to the molten metal filled in the cavity Ca.

The extrusion device 12 has a function of extruding the manufactured die-cast product from the mold 18.

The control unit 20 includes a control device 32, an input device 34, and a display device 36. The control unit 20 has a function of controlling the molding operation of the die casting machine 100 using the mold clamping device 10, the extrusion device 12, the injection device 14, and the first pressurizing device 16.

The input device 34 receives an input operation of an operator. The operator can set the molding condition and the like of the die casting machine 100 using the input device 34. The input device 34 is, for example, a touch panel using a liquid crystal display or an organic EL display.

The display device 36 displays, for example, the molding condition, the operation state, and the like of the die casting machine 100 on the screen. The display device 36 is, for example, a liquid crystal display or an organic EL display.

The control device 32 has a function of performing various calculations and outputting a control command to each part of the die casting machine 100. The control device 32 has a function of storing, for example, the molding condition and the like. The control device 32 controls, for example, the operation of the injection device 14. The control device 32 controls the operation of the first pressurizing device 16, for example, based on the filling state of the molten metal into the cavity Ca of the mold 18. The control device 32 controls the first pressurizing device so that the second pressure becomes higher than the first pressure.

The control device 32 is configured by, for example, the combination of hardware and software. The control device 32 includes, for example, a CPU (Central Processing Unit), a semiconductor memory, and a control program stored in the semiconductor memory.

Figure 2:
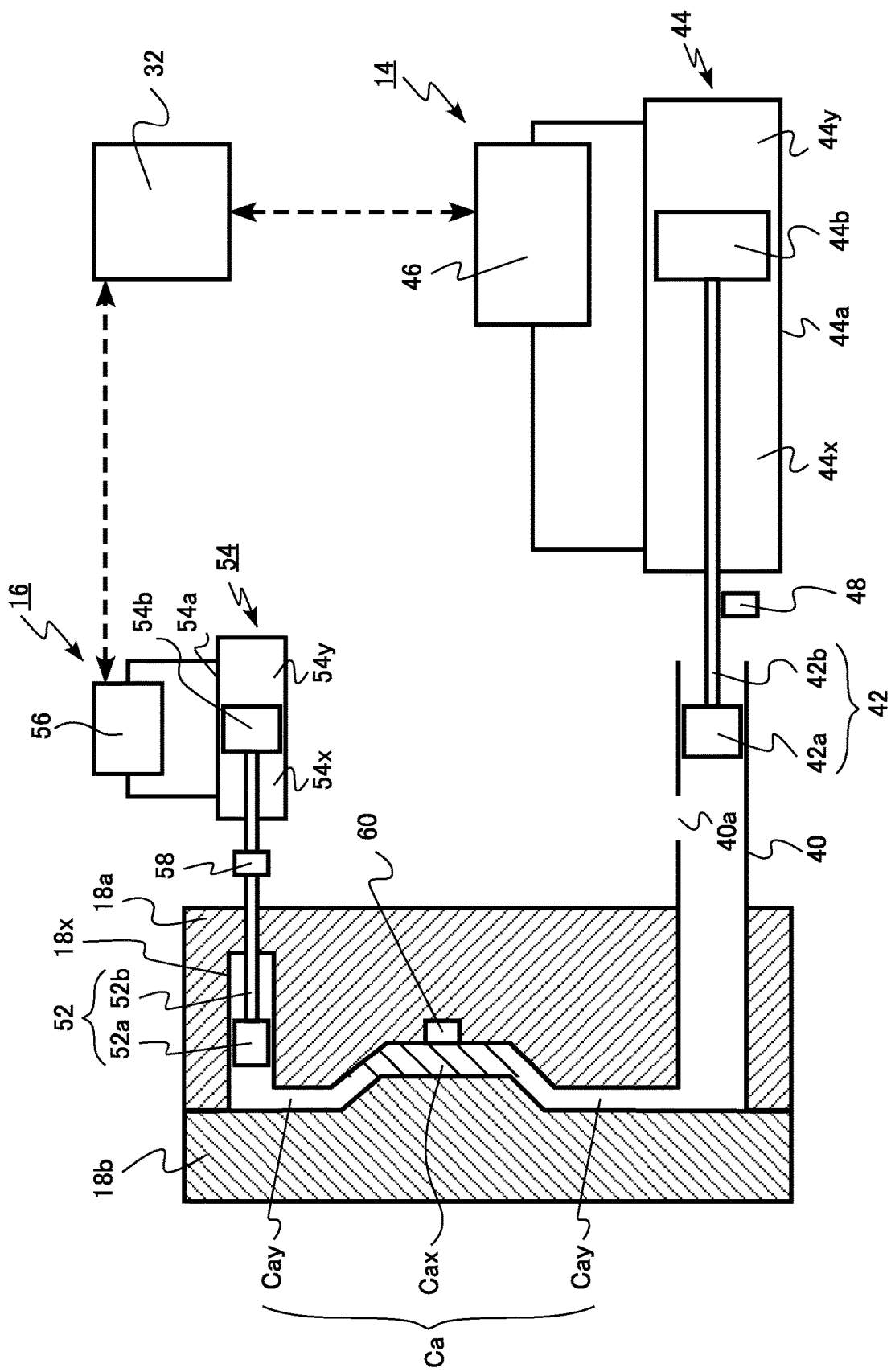
FIG. 2 is a schematic view of an injection device and a first pressurizing device of the die casting machine of the first embodiment.
Figure 3B:
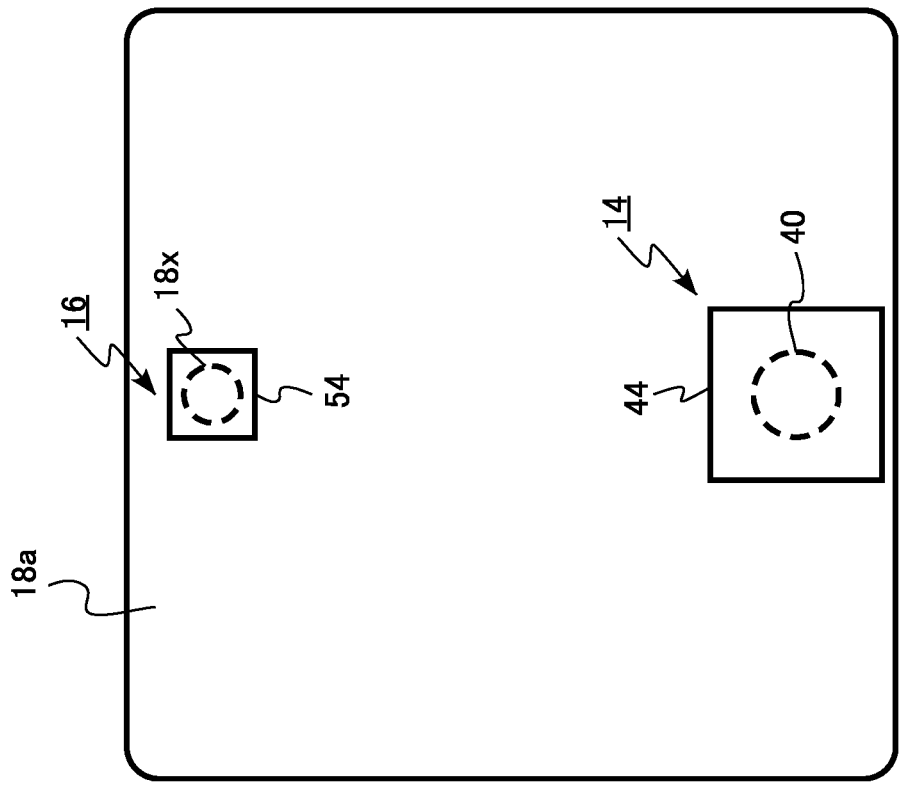
FIG. 3A, FIG. 3B are schematic views including a fixed die of the die casting machine of the first embodiment.
Figure 3A:
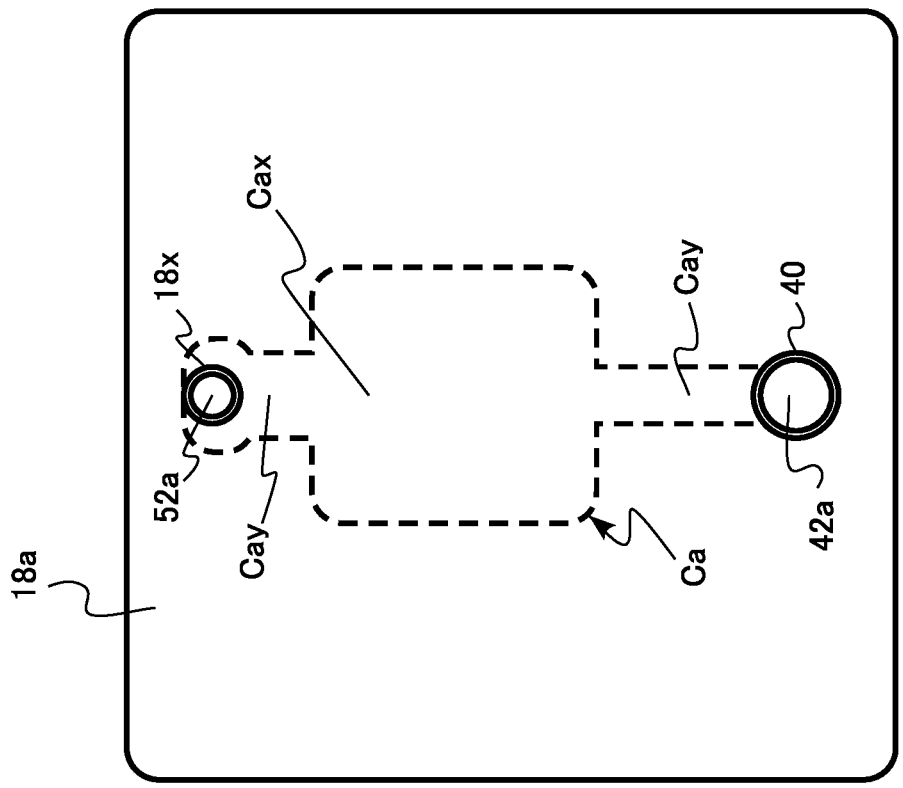

FIG. 2 is a schematic view of the injection device and the first pressurizing device of the die casting machine of the first embodiment. FIG. 3A and FIG. 3B are schematic views including the fixed die of the die casting machine of the first embodiment. FIG. 3A is a plan view in which the fixed die 18a is viewed from the side of the movable die plate 26. FIG. 3B is a plan view in which the movable die 18b is viewed from the side of the fixed die plate 24.

The injection device 14 includes an injection sleeve 40, an injection plunger 42, an injection actuator 44, a first hydraulic circuit 46 (first liquid pressure circuit), and a position sensor 48. The injection sleeve 40 includes a molten metal supply port 40a. The injection plunger 42 includes an injection plunger tip 42a and an injection plunger rod 42b. The injection actuator 44 includes an injection cylinder 44a, an injection piston 44b, a rod side chamber 44x, and a cap side chamber 44y.

The injection sleeve 40 connected to the cavity Ca of the mold 18. The injection sleeve 40 is, for example, a tubular member connected to the fixed die 18a. The injection sleeve 40 has, for example, a cylindrical shape.

The injection plunger 42 slides in the injection sleeve 40. The injection plunger tip 42a fixed to the tip of the injection plunger rod 42b slides forward and backward in the injection sleeve 40. When the injection plunger tip 42a slides forward in the injection sleeve 40, the molten metal in the injection sleeve 40 is extruded into the mold 18.

The injection plunger 42 applies the first pressure to the molten metal by pressurizing the molten metal after the molten metal is filled into the cavity Ca of the mold 18.

The molten metal supply port 40a is provided, for example, at the upper portion of the injection sleeve 40. For example, the molten metal is supplied from the molten metal supply port 40a into the injection sleeve 40 by a ladle (not shown).

The injection actuator 44 is, for example, a hydraulic actuator. The injection actuator 44 has a function of moving the injection plunger 42. The injection plunger 42 moves when the injection piston 44b in the injection cylinder 44a pushes and pulls the injection plunger rod 42b.

The first hydraulic circuit 46 has a function of driving the injection actuator 44. The first hydraulic circuit 46 is an example of the first liquid pressure circuit. The first hydraulic circuit 46 is connected to the rod side chamber 44x and the cap side chamber 44y of the injection cylinder 44a. The first hydraulic circuit 46 is connected to the pressurization side and the back pressure side of the injection cylinder 44a by the pipes.

The position sensor 48 has a function of detecting the position of the injection plunger 42. The position sensor 48 is, for example, an optical or magnetic linear encoder. By differentiating the position of the injection plunger 42 detected by the position sensor 48, it is possible to detect the speed of the injection plunger 42.

The first pressurizing device 16 includes a first pressurizing plunger 52, a first pressurizing actuator 54, a second hydraulic circuit 56 (second liquid pressure circuit), and a first load sensor 58. The first pressurizing plunger 52 includes a first pressurizing plunger tip 52a and a first pressurizing plunger rod 52b. The first pressurizing actuator 54 includes a first pressurizing cylinder 54a, a first pressurizing piston 54b, a first rod side chamber 54x, and a first cap side chamber 54y.

The cavity Ca formed by the fixed die 18a and the movable die 18b includes a product region Cax (a hatched region in FIG. 2) and a non-product region Cay. The molten metal solidified in the product region Cax is used as a die-cast product. For example, the molten metal solidified in the non-product region Cay is removed in a trimming process and is not used as the die-cast product. The non-product regions Cay are, for example, runners, overflows, air vents, and the like.

For example, a first guide region 18x is provided in the non-product region Cay of the fixed die 18a. The first guide region 18x is, for example, a cylindrical recess provided in the fixed die 18a. The first guide region 18x is provided on the opposite side of the product region Cax with respect to the injection sleeve 40. The product region Cax is interposed between the first guide region 18x and the injection sleeve 40.

The first pressurizing plunger 52 slides in the first guide region 18x. The first pressurizing plunger tip 52a fixed to the tip of the first pressurizing plunger rod 52b slides forward and backward in the first guide region 18x.

The first pressurizing plunger 52 applies the second pressure to the molten metal by pressurizing the molten metal after the molten metal is filled into the cavity Ca of the mold 18. When the first pressurizing plunger tip 52a slides forward in the first guide region 18x, the molten metal is pressurized.

The first pressurizing actuator 54 is, for example, a hydraulic actuator. The first pressurizing actuator 54 has a function of moving the first pressurizing plunger 52. The first pressurizing plunger 52 moves when the first pressurizing piston 54b in the first pressurizing cylinder 54a pushes and pulls the first pressurizing plunger rod 52b.

For example, as shown in FIG. 1, the first pressurizing actuator 54 of the first pressurizing device 16 is provided in the fixed die plate 24.

The second hydraulic circuit 56 has a function of driving the first pressurizing actuator 54. The second hydraulic circuit 56 is an example of the second liquid pressure circuit. The second hydraulic circuit 56 is connected to the first rod side chamber 54x and the first cap side chamber 54y of the first pressurizing cylinder 54a. The second hydraulic circuit 56 is connected to the pressurization side and the back pressure side of the first pressurizing cylinder 54a by the pipes.

The first load sensor 58 has a function of measuring the load applied to the first pressurizing plunger rod 52b. For example, it is possible to detect the completion of the filling of the molten metal into the cavity Ca of the mold 18 by determining the contraction state of the first pressurizing plunger rod 52b using the first load sensor 58.

For example, a molten metal pressure sensor 60 is provided in the mold 18. The molten metal pressure sensor 60 can detect the completion of the filling of the molten metal into the cavity Ca of the mold 18 by directly measuring the pressure of the molten metal filled into the cavity Ca.

The operations of the injection device 14 and the first pressurizing device 16 are controlled by the control device 32. The operations of the first hydraulic circuit 46 and the second hydraulic circuit 56 are controlled by the control device 32. The first hydraulic circuit 46 and the second hydraulic circuit 56 are connected to the control device 32 in a wired or wireless state.

Figure 4:
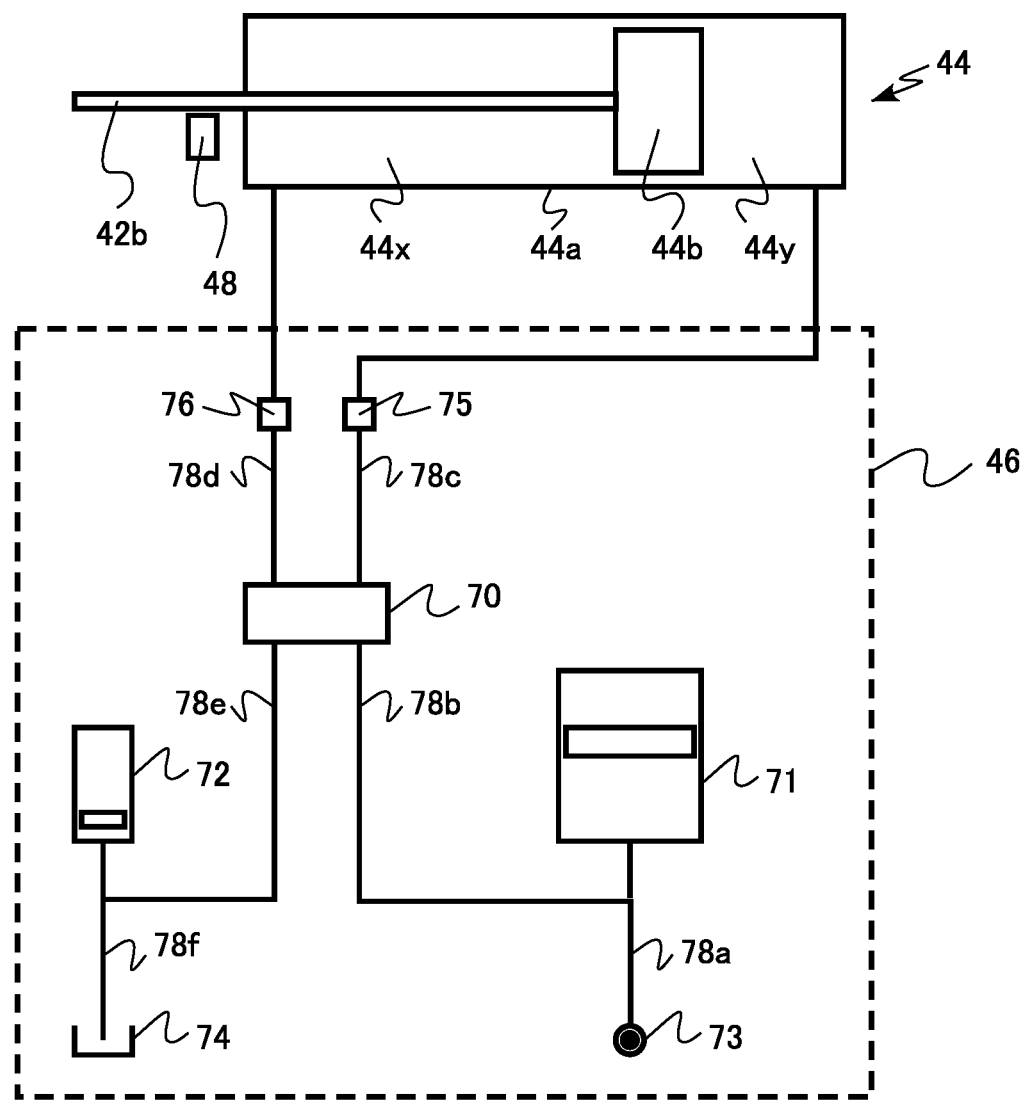
FIG. 4 is a schematic view of a first liquid pressure circuit of the die casting machine of the first embodiment.

FIG. 4 is a schematic view of the first hydraulic circuit of the die casting machine of the first embodiment. The first hydraulic circuit 46 drives the injection actuator 44.

The first hydraulic circuit 46 includes a first valve 70, a first accumulator 71, a first back pressure absorbing cylinder 72, a pump 73, a tank 74, a pressurization side hydraulic sensor 75, a back pressure side hydraulic sensor 76, and pipes 78a, 78b, 78c, 78d, 78e, and 78f.

The first valve 70 controls the flow of the first hydraulic oil (first hydraulic liquid) flowing in the first hydraulic circuit 46. The first valve 70 controls the supply and the stop of the first hydraulic oil from the pump 73 to the injection actuator 44. The first valve 70 controls the discharge and the stop of the first hydraulic oil from the injection actuator 44 to the tank 74.

The first valve 70 is, for example, a servo valve. The servo valve is an electromagnetic direction switching valve that switches the flow path using an electromagnetic force. The servo valve has high response performance to the input signal.

The first accumulator 71 is provided between the pump 73 and the first valve 70. The first accumulator 71 stores energy using a high-pressure enclosed gas and momentarily discharges the energy to increase the flow rate of the first hydraulic oil. Since the first accumulator 71 is provided, it is possible to generate a high pressure using the injection actuator 44 by operating the injection actuator 44 at a high speed.

The first back pressure absorbing cylinder 72 is provided between the first valve 70 and the tank 74. Since the first back pressure absorbing cylinder 72 is provided, it is possible to rapidly decrease the pressure on the back pressure side of the injection actuator 44, that is, the pressure of the rod side chamber 44x of the injection cylinder 44a. Thus, it is possible to operate the injection actuator 44 at a high speed.

The pressurization side hydraulic sensor 75 is provided between the first valve 70 and the injection actuator 44. The pressurization side hydraulic sensor 75 is provided in the pipe 78c. The pressurization side hydraulic sensor 75 can measure the pressure on the pressurization side of the injection actuator 44, that is, the pressure of the cap side chamber 44y.

The back pressure side hydraulic sensor 76 is provided between the first valve 70 and the injection actuator 44. The back pressure side hydraulic sensor 76 is provided in the pipe 78d. The back pressure side hydraulic sensor 76 can measure the hydraulic pressure on the back pressure side of the injection actuator 44, that is, the hydraulic pressure of the rod side chamber 44x.

Figure 5:
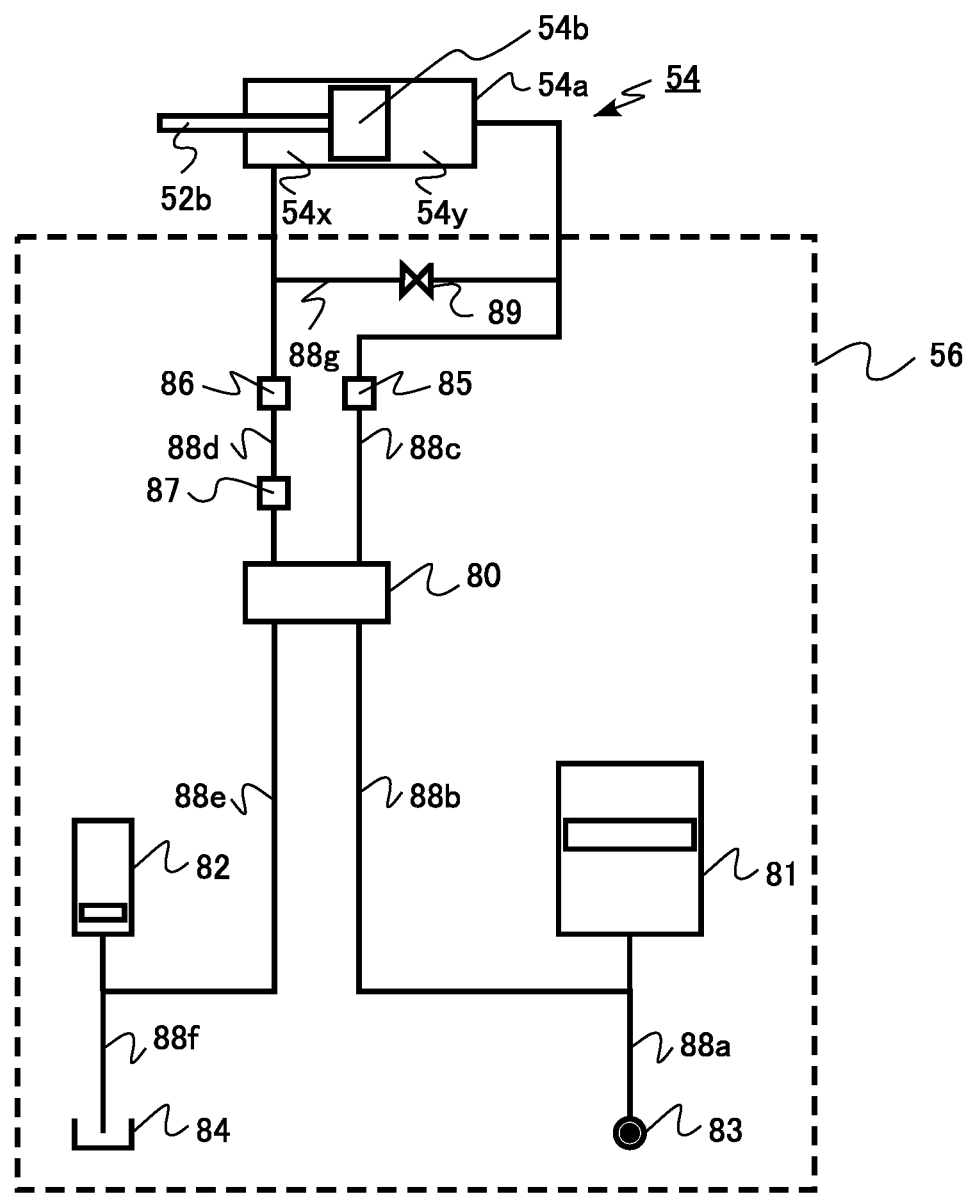
FIG. 5 is a schematic view of a second liquid pressure circuit of the die casting machine of the first embodiment.

FIG. 5 is a schematic view of the second hydraulic circuit of the die casting machine of the first embodiment. The second hydraulic circuit 56 drives the first pressurizing actuator 54.

The second hydraulic circuit 56 includes a second valve 80, a second accumulator 81, a second back pressure absorbing cylinder 82, a pump 83, a tank 84, a pressurization side hydraulic sensor 85 (first liquid pressure sensor), a back pressure side hydraulic sensor 86 (second liquid pressure sensor), a flow rate sensor 87, pipes 88a, 88b, 88c, 88d, 88e, 88f, and 88g, and a degassing valve 89.

The second valve 80 controls the flow of the second hydraulic oil (second hydraulic liquid) flowing in the second hydraulic circuit 56. The second valve 80 controls the supply and the stop of the second hydraulic oil from the pump 83 to the first pressurizing actuator 54. The second valve 80 controls the discharge and the stop of the second hydraulic oil from the first pressurizing actuator 54 to the tank 84.

The second valve 80 is, for example, a servo valve. The servo valve is an electromagnetic direction switching valve that switches the flow path using an electromagnetic force. The servo valve has high response performance to the input signal.

The second accumulator 81 is provided between the pump 83 and the second valve 80. The second accumulator 81 stores energy using a high-pressure enclosed gas and momentarily discharges the energy to increase the flow rate of the second hydraulic oil. Since the second accumulator 81 is provided, it is possible to generate a high pressure using the first pressurizing actuator 54 by operating the first pressurizing actuator 54 at a high speed.

The second back pressure absorbing cylinder 82 is provided between the second valve 80 and the tank 84. Since the second back pressure absorbing cylinder 82 is provided, it is possible to rapidly decrease the pressure on the back pressure side of the first pressurizing actuator 54, that is, the pressure of the rod side chamber 54x of the first pressurizing cylinder 54a. Thus, it is possible to operate the first pressurizing actuator 54 at a high speed.

The pressurization side hydraulic sensor 85 is provided between the second valve 80 and the first pressurizing actuator 54. The pressurization side hydraulic sensor 85 is an example of the first liquid pressure sensor. The pressurization side hydraulic sensor 85 is provided in the pipe 88c. The pressurization side hydraulic sensor 85 can measure the hydraulic pressure on the pressurization side of the first pressurizing actuator 54, that is, the hydraulic pressure of the cap side chamber 54y.

The back pressure side hydraulic sensor 86 is provided between the second valve 80 and the first pressurizing actuator 54. The back pressure side hydraulic sensor 86 is an example of the second liquid pressure sensor. The back pressure side hydraulic sensor 86 is provided in the pipe 88d. The back pressure side hydraulic sensor 86 can measure the hydraulic pressure on the back pressure side of the first pressurizing actuator 54, that is, the hydraulic pressure of the rod side chamber 54x.

The flow rate sensor 87 measures the flow rate of the second hydraulic oil flowing in the pipe 88d. By measuring the flow rate of the second hydraulic oil, it is possible to monitor the speed of the first pressurizing piston 54b, that is, the speed of the first pressurizing plunger rod 52b and the first pressurizing plunger tip 52a, that is, the speed of the first pressurizing plunger 52.

The pipe 88g is a short-circuit flow path that short-circuits the pressurization side and the back pressure side of the first pressurizing actuator 54. The pipe 88g short-circuits the pipe 88c and the pipe 88d by opening the degassing valve 89 to bypass the first pressurizing actuator 54.

Since the pipe 88c and the pipe 88d are short-circuited by bypassing the first pressurizing actuator 54, it is possible to extract the gas (air) accumulated in the second hydraulic oil. Since the gas (air) accumulated in the second hydraulic oil is extracted, the operations of the first pressurizing actuator 54 and the second hydraulic circuit 56 are stable.

Figure 6:
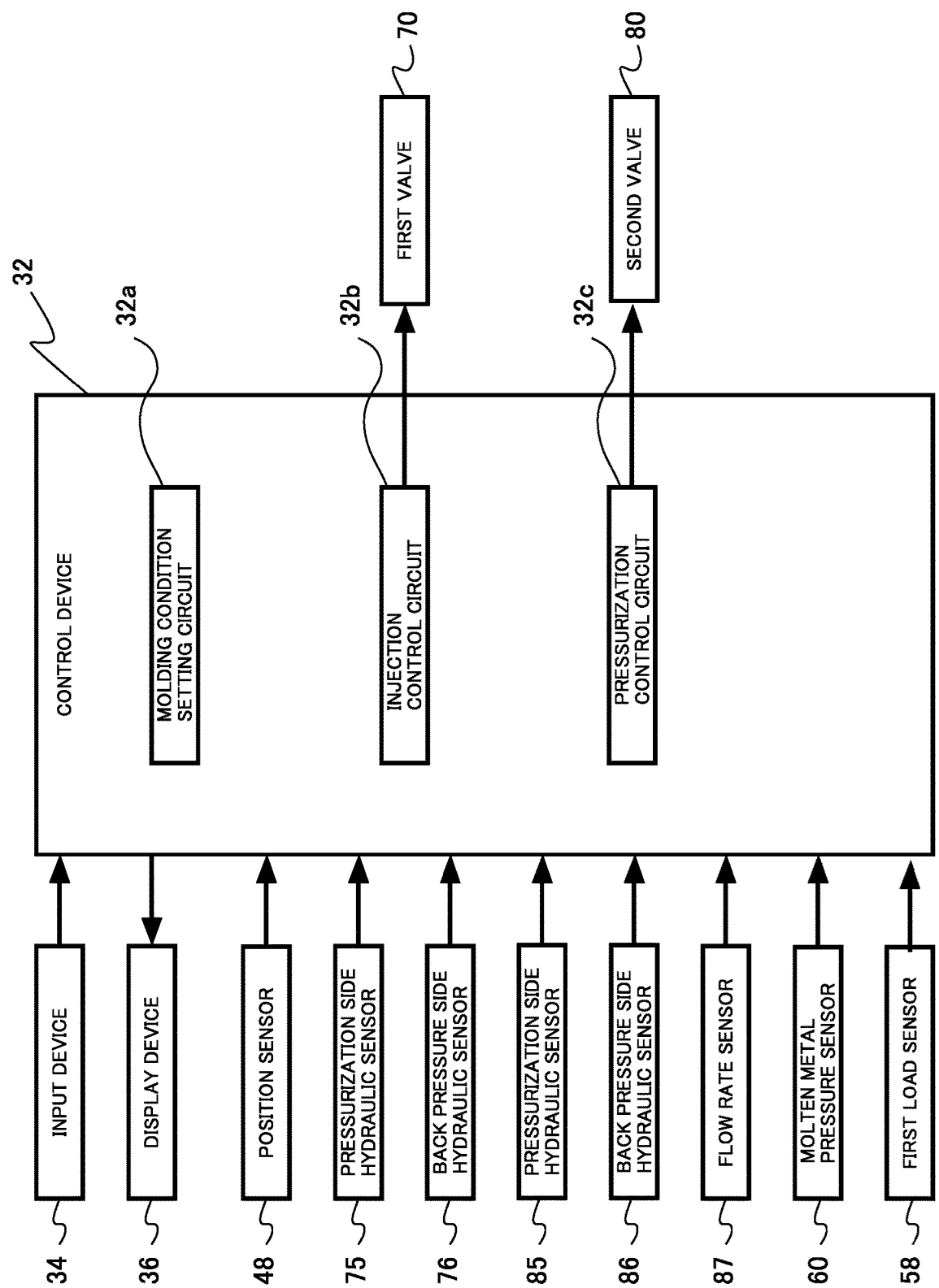
FIG. 6 is a block diagram showing a configuration of a signal processing system of the die casting machine of the first embodiment.

FIG. 6 is a block diagram showing a configuration of a signal processing system of the die casting machine of the first embodiment.

For example, as shown in FIG. 6, the control device 32 includes a molding condition setting circuit 32a, an injection control circuit 32b, and a pressurization control circuit 32c.

The molding condition setting circuit 32a has a function of setting various molding conditions of the die casting machine 100 based on the signal from the input device 34. The molding condition setting circuit 32a sets, for example, the injection speed of the injection plunger 42 of the injection device 14, the operation start timing of the first pressurizing device 16, and the like.

The injection control circuit 32b controls the operation of the injection device 14. Specifically, for example, the operation of the injection device 14 is controlled by transmitting a command signal to the first valve 70 provided in the first hydraulic circuit 46 and controlling the opening and closing of the first valve 70.

The injection control circuit 32b controls the opening and closing of the first valve 70 to control the speed of the injection plunger 42, for example, based on the speed of the injection plunger 42 monitored by the position sensor 48. Further, the opening and closing of the first valve 70 is controlled to control the first pressure applied to the molten metal by the injection plunger 42, for example, based on the measurement values of the hydraulic pressure measured by the pressurization side hydraulic sensor 75 and the back pressure side hydraulic sensor 76.

The pressurization control circuit 32c controls the operation of the first pressurizing device 16. Specifically, for example, the operation of the first pressurizing device 16 is controlled by transmitting a command signal to the second valve 80 provided in the second hydraulic circuit 56 and controlling the opening and closing of the second valve 80.

The pressurization control circuit 32c controls the first pressurizing device 16 so that the pressurization of the molten metal by the first pressurizing device 16 is stated after the filling of the molten metal into the cavity Ca is completed. The pressurization control circuit 32c controls the first pressurizing device 16 so that the operation of the first pressurizing device 16 is started after the filling of the molten metal into the cavity Ca is completed.

The pressurization control circuit 32c controls the opening and closing of the second valve 80 to control the start of the operation of the first pressurizing plunger 52, for example, based on the speed of the injection plunger 42 monitored by the position sensor 48. For example, the operation of the first pressurizing plunger 52 is controlled to start immediately after the injection plunger 42 is stopped. The time when the injection plunger 42 is stopped is determined to be the time when the filling of the molten metal into the cavity Ca is completed.

The pressurization control circuit 32c controls the opening and closing of the second valve 80 to control the start of the operation of the first pressurizing plunger 52, for example, based on the measurement value of the molten metal pressure sensor 60. For example, the operation of the first pressurizing plunger 52 is controlled to start immediately after the pressure applied to the molten metal reaches a predetermined pressure. The time when the molten metal pressure reaches the predetermined pressure is determined to be the time when the filling of the molten metal into the cavity Ca is completed.

The pressurization control circuit 32c controls the opening and closing of the second valve 80 to control the start of the operation of the first pressurizing plunger 52, for example, based on the measurement value of the first load sensor 58. For example, the operation of the first pressurizing plunger 52 is controlled to start immediately after the load of the first pressurizing plunger rod 52b reaches a predetermined value. The time when the load of the first pressurizing plunger rod 52b reaches the predetermined value is determined to be the time when the filling of the molten metal into the cavity Ca is completed.

The pressurization control circuit 32c controls the opening and closing of the second valve 80 to control the second pressure applied to the molten metal by the first pressurizing plunger 52, for example, based on the measurement values of the hydraulic pressure measured by the pressurization side hydraulic sensor 85 and the back pressure side hydraulic sensor 86. The pressurization control circuit 32c controls the opening and closing of the second valve 80 so that the second pressure is 1.1 times or more and 3 times or less the first pressure.

The pressurization control circuit 32c controls the opening and closing of the second valve 80 to control the speed of the first pressurizing plunger 52, for example, based on the measurement value of the flow rate sensor 87.

Next, an example of the operation of the die casting machine 100 will be described. In particular, the operations of the injection device 14 and the first pressurizing device 16 of the die casting machine 100 will be described. The description of the operations other than the operations of the injection device 14 and the first pressurizing device 16 of the die casting machine 100, for example, the operations of the mold clamping device 10 and the extrusion device 12 will be omitted.

Figure 7:
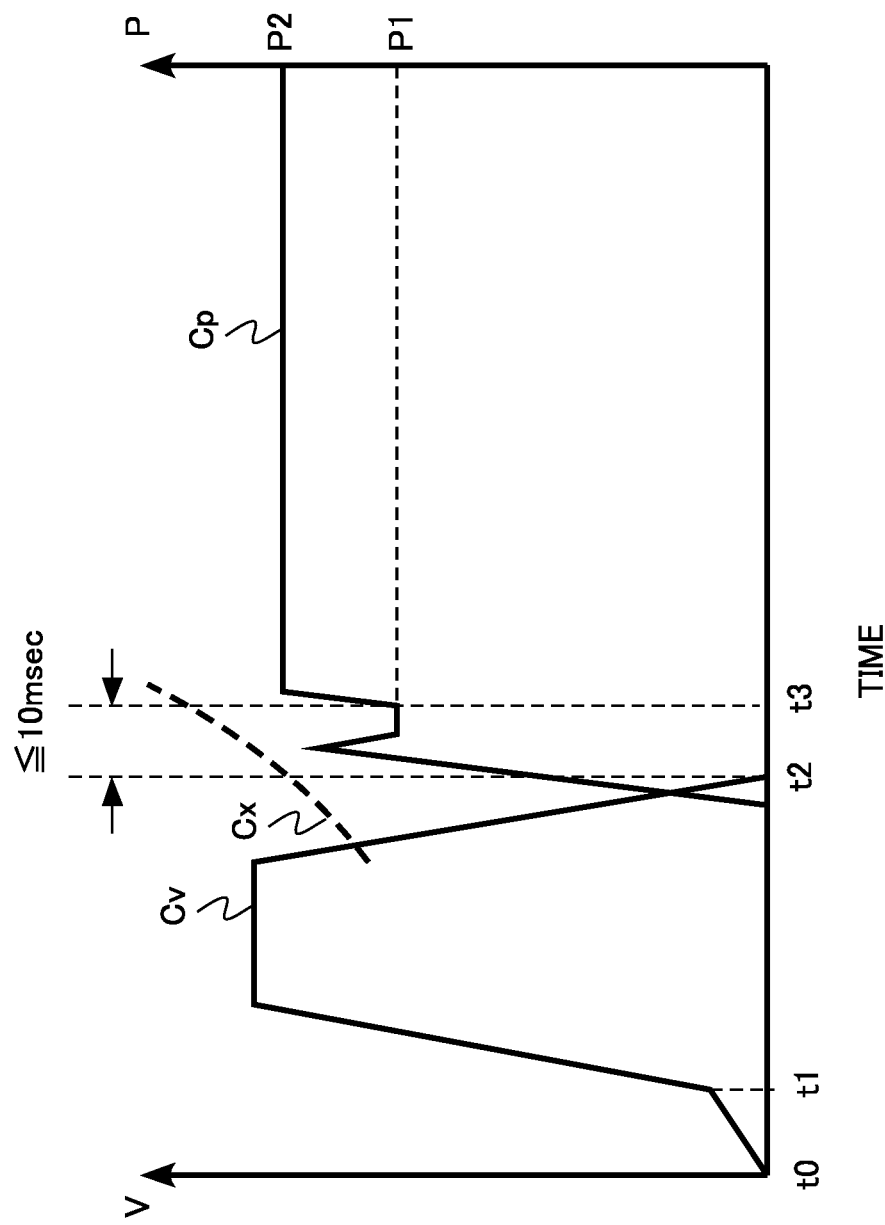
FIG. 7 is a graph showing an example of an operation of the injection device and the first pressurizing device of the die casting machine of the first embodiment.

FIG. 7 is a graph showing an example of the operations of the injection device and the first pressurizing device of the die casting machine of the first embodiment. The horizontal axis is the time. As time goes by, the plotted points are located on the right side of the paper. The vertical axis on the left side of the paper indicates the injection speed, that is, the speed of the injection plunger 42. Further, the vertical axis on the right side of the paper indicates the pressure applied to the molten metal in the cavity Ca.

The solid line Cv in FIG. 7 is the speed of the injection plunger 42 and the solid line Cp in FIG. 7 is the pressure applied to the molten metal. The mid-dotted line Cx in FIG. 7 is a burr blowing critical curve. When the pressure applied to the molten metal exceeds the burr blowing critical curve, the pressure applied to the molten metal may exceed the mold clamping force to cause burr.

At the time t0, the operation of the injection plunger 42 of the injection device 14 is started in accordance with the command from the injection control circuit 32b of the control device 32. Prior to the start of the operation of the injection plunger 42, the molten metal is supplied from the molten metal supply port 40a into the injection sleeve 40.

The speed of the injection plunger 42 is low from the time t0 to the time t1. The speed of the injection plunger 42 is less than, for example, 1 m/sec.

The speed of the injection plunger 42 increases from the time t1. The speed of the injection plunger 42 is, for example, 1 m/sec or more. At the time t1, the injection plunger tip 42a is in a state of blocking the molten metal supply port 40a.

At the time t2, the injection plunger 42 is stopped. At the time t2, the filling of the molten metal into the cavity Ca formed by the fixed die 18a and the movable die 18b is completed.

The pressurization of the molten metal by the injection plunger 42 is started before the injection plunger 42 is stopped. A high pressure is applied to the molten metal after the filling is completed in order to reduce the cavities generated by air caught during the filling of the molten metal and the cavities generated when the molten metal is solidified after the filling is completed.

The pressure applied to the molten metal by the injection plunger 42 is the first pressure P1. The first pressure P1 can be calculated from the force applied to the injection piston 44b and the area ratio between the injection piston 44b and the injection plunger tip 42a.

When the injection plunger 42 is stopped, a surge pressure that momentarily exceeds the first pressure P1 may be generated. When the surge pressure exceeds the burr blowing critical curve, the pressure applied to the molten metal may exceed the mold clamping force to cause burr.

For example, at the time when the filling of the molten metal into the cavity Ca is completed, the operation of the first pressurizing plunger 52 of the first pressurizing device 16 stats by the command from the pressurization control circuit 32c of the control device 32. For example, the operation of the first pressurizing plunger 52 is started when the injection plunger 42 is stopped. For example, the operation of the first pressurizing plunger 52 is started when the pressure applied to the molten metal reaches a predetermined pressure. Further, for example, the operation of the first pressurizing plunger 52 is started when the load of the first pressurizing plunger rod 52b reaches a predetermined value.

The pressurization of the molten metal by the first pressurizing plunger 52 is started, for example, within 10 msec after the fitting of the molten metal into the cavity Ca is completed.

The pressure applied to the molten metal by the first pressurizing plunger 52 is the second pressure. The second pressure P2 can be calculated from the force applied to the first pressurizing piston 54b and the area ratio between the first pressurizing piston 54b and the first pressurizing plunger tip 52a.

The second pressure is larger than the first pressure. The second pressure is, for example, 1.1 times or more and 3 times or less the first pressure. The second pressure is, for example, 1.2 times or more and 1.5 times or less the first pressure.

Since the first pressurizing plunger 52 applies the second pressure to the first pressure applied by the injection plunger 42, the pressure applied to the molten metal finally increases. The pressure finally applied to the molten metal is the casting pressure.

Next, the function and effect of the die casting machine 100 of the first embodiment will be described.

For example, in the die casting machine not including the first pressurizing device, a high pressure needs to be applied to the molten metal after the injection plunger is stopped in order to reduce the cavities generated by air caught during the filling of the molten metal and the cavities generated when the molten metal is solidified after the filling is completed. That is, the casting pressure needs to be increased.

After the filling of the molten metal is completed, the molten metal is solidified over time. Therefore, the propagation of the pressure due to the pressurization of the molten metal by the injection plunger is limited. Therefore, in particular, in order to make the pressure of the molten metal in the region far from the injection plunger a desired pressure, it is necessary to apply a high pressure to the molten metal by the injection plunger.

However, in order to increase the casting pressure, the capacity required for the mold clamping device or the injection device is increased. Specifically, for example, a hydraulic device or a link mechanism that generates a high pressure is required to increase the mold clamping force of the mold clamping device. Further, for example, in order to apply a high pressure by the injection device, it is necessary to add a pressure boosting mechanism such as a pressure boosting piston. Thus, a problem arises in that the manufacturing cost of the die casting machine increases.

Further, when a high pressure is applied to the molten metal by the injection plunger, the surge pressure may exceed the burr blowing critical curve, and the pressure applied to the molten metal may exceed the mold clamping force to cause burr.

The die casting machine 100 of the first embodiment includes the first pressurizing device 16 in addition to the injection device 14. The first pressurizing device 16 pressurizes the molten metal in a region other than the product region of the cavity Ca before the solidification of the molten metal filled in the cavity Ca of the mold 18 progresses.

Since both the injection device 14 and the first pressurizing device 16 apply a pressure to the molten metal before solidification progresses, the pressure is more likely to be uniformly transmitted into the molten metal. Therefore, it is possible to suppress segregation, coarsened structure, and cavities in the die-cast product after solidification. Thus, it is possible to decrease the casting pressure. Thus, it is not necessary to increase the capacity of the mold clamping device or the injection device and it is possible to decrease the manufacturing cost of the die casting machine.

Further, the control device 32 controls the first pressurizing device 16 so that the second pressure higher than the first pressure applied to the molten metal by the injection device 14 is applied to the molten metal by the first pressurizing device 16. Thus, a sufficient pressure is applied to the molten metal even when the molten metal is solidified to some extent.

Further, since the second pressure is higher than the first pressure, it is possible to suppress the occurrence of burr. Since the first pressure is low, the surge pressure when the injection plunger 42 is stopped decreases and the occurrence of burr is suppressed.

From the viewpoint of applying a sufficient pressure to the molten metal, the second pressure is preferably 1.1 times or more and more preferably 1.2 times or more the first pressure. Further, from the viewpoint of suppressing the occurrence of burr, the second pressure is preferably 3 times or less and more preferably 1.5 times or less the first pressure.

The die casting machine 100 of the first embodiment pressurizes the non-product region Cay of the cavity Ca of the mold 18. Thus, the die-cast product is not affected by segregation in the molten metal caused by pressurization. Thus, it is possible to manufacture the high-quality die-cast product.

Further, the die casting machine 100 of the first embodiment reduces a mechanical stress applied to the mold 18 by decreasing the casting pressure. Thus, the life of the mold 18 is extended.

In order to pressurize the molten metal before solidification of the molten metal progresses, the control device 32 preferably controls the first pressurizing device 16 so that the pressurization of the molten metal by the first pressurizing device 16 is started within 10 msec after the filling of the molten metal into the cavity Ca of the mold 18 is completed.

For example, the elapsed time from time t2 to time t3 shown in FIG. 7 is preferably 10 msec or less.

For example, the control device 32 preferably controls the first pressurizing device 16 so that the operation of the first pressurizing plunger 52 is started within 10 msec after the injection plunger 42 is stopped.

Further, for example, the control device 32 preferably controls the first pressurizing device 16 so that the operation of the first pressurizing plunger 52 is started within 10 msec after the pressure applied to the molten metal reaches a predetermined pressure. Further, for example, the first pressurizing device 16 is preferably controlled so that the operation of the first pressurizing plunger 52 is started within 10 msec after the load of the first pressurizing plunger rod 52b reaches a predetermined value.

From the viewpoint of applying a sufficient pressure to the molten metal, the first guide region 18x of the fixed die 18a is preferably provided on the side opposite to the injection sleeve 40 with the product region Cax interposed therebetween. That is, the first pressurizing device 16 is preferably provided to pressurize the non-product region Cay on the side opposite to the non-product region Cay pressurized by the injection device 14 with the product region Cax interposed therebetween.

In order to pressurize the molten metal before the solidification of the molten metal progresses, the first pressurizing device 16 preferably has high responsiveness and operates at a high speed similarly to the injection device 14.

From the viewpoint that the first pressurizing device 16 has high responsiveness, the second valve 80 is preferably a servo valve having high responsiveness.

From the viewpoint of operating the first pressurizing device 16 at a high speed, the second hydraulic circuit 56 preferably includes the second accumulator 81 and the second back pressure absorbing cylinder 82. Since the second accumulator 81 and the second back pressure absorbing cylinder 82 are provided, it is possible to increase the flow rate of the second hydraulic oil and to operate the first pressurizing device 16 at a high speed.

From the viewpoint of highly accurately controlling the second pressure applied to the molten metal by the first pressurizing device 16, the control device 32 preferably controls the opening and closing of the second valve 80 to control the second pressure applied to the molten metal by the first pressurizing plunger 52 based on the measurement values of the hydraulic pressure measured by the pressurization side hydraulic sensor 85 and the back pressure side hydraulic sensor 86.

The second hydraulic circuit 56 preferably includes the pipe 88g corresponding to the short-circuit flow path short-circuiting the pressurization side and the back pressure side of the first pressurizing actuator 54 and the degassing valve 89. The operation of the first pressurizing actuator 54 and the second hydraulic circuit 56 is stable.

The second hydraulic circuit 56 preferably includes the flow rate sensor 87 and the pressurization control circuit 32c of the control device 32 preferably controls the opening and closing of the second valve 80 to control the speed of the first pressurizing plunger 52 based on the measurement value of the flow rate sensor 87. The speed of the first pressurizing plunger 52 is stable.

The first pressurizing actuator 54 of the first pressurizing device 16 is preferably provided in the fixed die plate 24. Further, the first pressurizing plunger 52 is preferably provided in the fixed die 18a. Since the first pressurizing actuator 54 is not provided in the fixed die 18a, it is easy to design and manufacture the fixed die 18a.

As described above, according to the first embodiment, since the first pressurizing device 16 is provided, it is possible to realize the die casting machine capable of decreasing the casting pressure.

Second Embodiment

A die casting machine of a second embodiment is different from the die casting machine of the first embodiment in that a second pressurizing device is further provided to pressurize a molten metal filled in a cavity in a region other than a product region of the cavity. Hereinafter, some descriptions may be omitted for the contents that overlap with the first embodiment.

Figure 8:
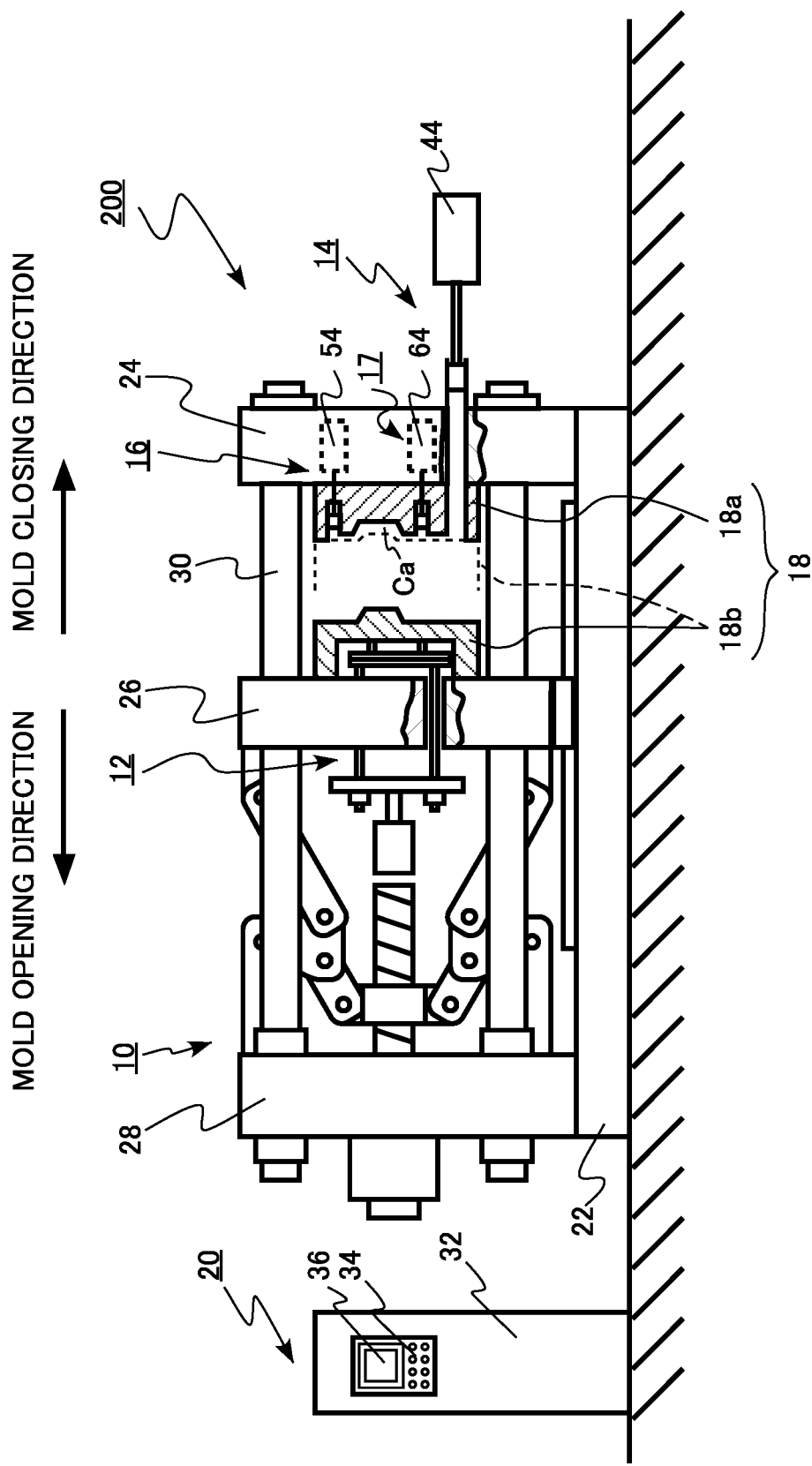
FIG. 8 is a schematic view showing an entire configuration of a die casting machine of a second embodiment.

FIG. 8 is a schematic view showing an entire configuration of the die casting machine of the second embodiment. FIG. 8 is a side view including a cross-sectional view in part. A die casting machine 200 of the second embodiment is a cold chamber type die casting machine.

The die casting machine 200 includes a mold clamping device 10, an extrusion device 12, an injection device 14, a first pressurizing device 16, a second pressurizing device 17, a mold 18, and a control unit 20.

The die casting machine 200 includes a base 22, a fixed die plate 24, a movable die plate 26, a link housing 28, and a tie bar 30.

The first pressurizing device 16 and the second pressurizing device 17 have functions of pressurizing a molten metal filled in a cavity Ca of the mold 18 in a region other than the product region of the cavity Ca.

Figure 9:
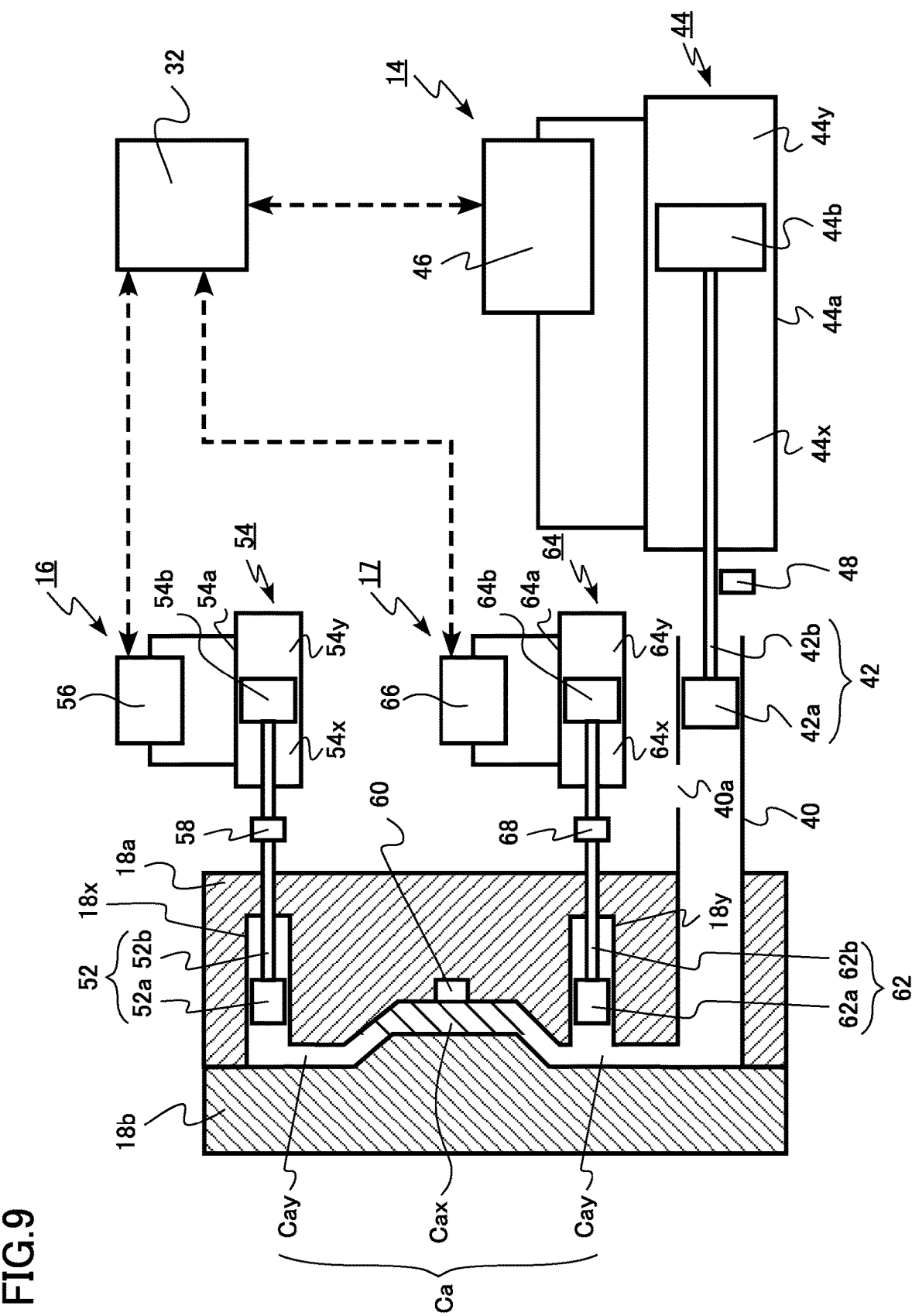
FIG. 9 is a schematic view of an injection device, a first pressurizing device, and a second pressurizing device of the die casting machine of the second embodiment.

FIG. 9 is a schematic view of an injection device, a first pressurizing device, and a second pressurizing device of the die casting machine of the second embodiment. The operation and function of the first pressurizing device 16 and the operation and function of the second pressurizing device 17 are basically the same except that the pressurizing position is different.

Figure 10A:
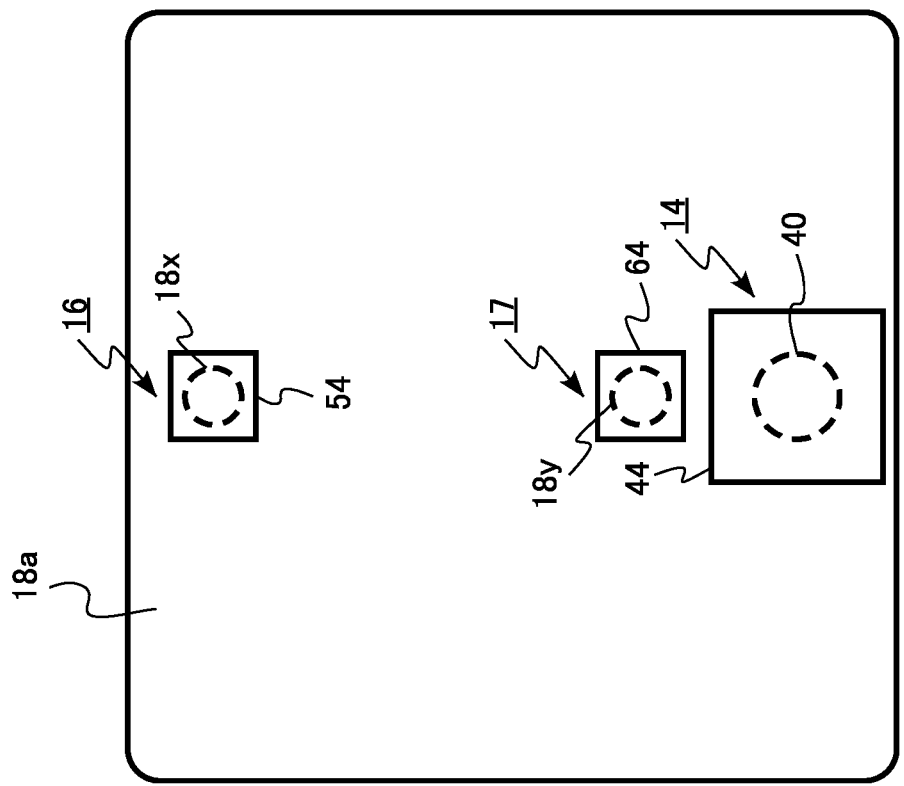
FIG. 10A, FIG. 10B are schematic views including a fixed die of the die casting machine of the second embodiment.
Figure 10B:
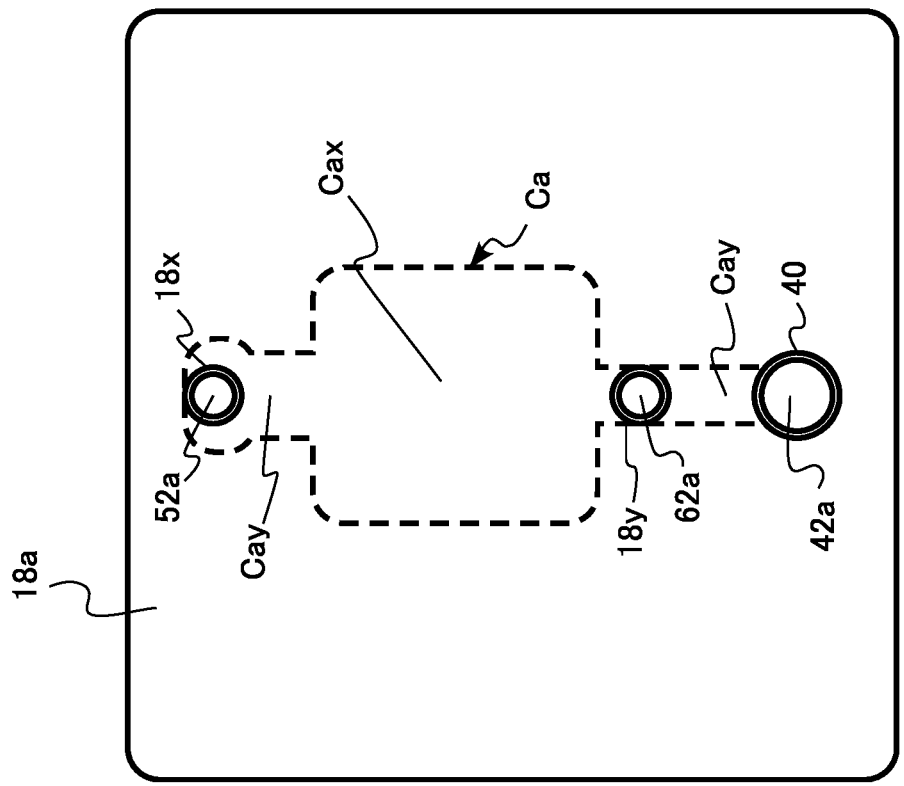

FIG. 10A and FIG. 10B are a schematic view including a fixed die of the die casting machine of the second embodiment. FIG. 10A is a plan view in which a fixed die 18a is viewed from the side of the movable die plate 26. FIG. 10B is a plan view in which a movable die 18b is viewed from the side of the fixed die plate 24.

The injection device 14 includes an injection sleeve 40, an injection plunger 42, an injection actuator 44, a first hydraulic circuit 46, and a position sensor 48. The injection sleeve 40 includes a molten metal supply port 40a. The injection plunger 42 includes an injection plunger tip 42a and an injection plunger rod 42b. The injection actuator 44 includes an injection cylinder 44a, an injection piston 44b, a rod side chamber 44x, and a cap side chamber 44y.

The first pressurizing device 16 includes a first pressurizing plunger 52, a first pressurizing actuator 54, a second hydraulic circuit 56, and a first load sensor 58. The first pressurizing plunger 52 includes a first pressurizing plunger tip 52a and a first pressurizing plunger rod 52b. The first pressurizing actuator 54 includes a first pressurizing cylinder 54a, a first pressurizing piston 54b, a first rod side chamber 54x, and a first cap side chamber 54y.

The second pressurizing device 17 includes a second pressurizing plunger 62, a second pressurizing actuator 64, a third hydraulic circuit 66 (third liquid pressure circuit), and a second load sensor 68. The second pressurizing plunger 62 includes a second pressurizing plunger tip 62a and a second pressurizing plunger rod 62b. The second pressurizing actuator 64 includes a second pressurizing cylinder 64a, a second pressurizing piston 64b, a second rod side chamber 64x, and a second cap side chamber 64y.

For example, a first guide region 18x is provided in a non-product region Cay of the fixed die 18a. The first guide region 18x is, for example, a cylindrical recess provided in the fixed die 18a. Further, for example, a second guide region 18y is provided in another non-product region Cay of the fixed die 18a. The second guide region 18y is, for example, a cylindrical recess provided in the fixed die 18a.

For example, the second guide region 18y is provided on the side opposite to the first guide region 18x with the product region Cax interposed therebetween. The product region Cax is interposed between the first guide region 18x and the second guide region 18y. For example, the second pressurizing device 17 is provided to pressurize the non-product region Cay on the side opposite to the non-product region Cay pressurized by the first pressurizing device 16 with the product region Cax interposed therebetween.

For example, as shown in FIG. 8, the second pressurizing actuator 64 of the second pressurizing device 17 is provided in the fixed die plate 24.

The pressure applied to the molten metal by the second pressurizing device 17 is the third pressure. The pressure applied to the molten metal by the second pressurizing plunger 62 is the third pressure. The third pressure is larger than the first pressure. The third pressure is, for example, 1.1 times or more and 1.5 times or less the first pressure.

FIG. 11 is a schematic view of the second hydraulic circuit and the third hydraulic circuit of the die casting machine of the second embodiment. The second hydraulic circuit 56 drives the first pressurizing actuator 54. The third hydraulic circuit 66 drives the second pressurizing actuator 64. The third hydraulic circuit 66 is an example of the third liquid pressure circuit. The operation and function of the second hydraulic circuit 56 and the operation and function of the third hydraulic circuit 66 are basically the same.

The second hydraulic circuit 56 includes a second valve 80, a second accumulator 81, a second back pressure absorbing cylinder 82, a pump 83, a tank 84, a pressurization side hydraulic sensor 85 (first liquid pressure sensor), a back pressure side hydraulic sensor 86 (second liquid pressure sensor), a flow rate sensor 87, pipes 88a, 88b, 88c, 88d, 88e, 88f, and 88g, and a degassing valve 89.

The third hydraulic circuit 66 includes a third valve 90, a second accumulator 81, a second back pressure absorbing cylinder 82, a pump 83, a tank 84, a pressurization side hydraulic sensor 95, a back pressure side hydraulic sensor 96, a flow rate sensor 97, pipes 98e, 98f, and 98g, and a degassing valve 99.

The second accumulator 81, the second back pressure absorbing cylinder 82, the pump 83, and the tank 84 are shared between the second hydraulic circuit 56 and the third hydraulic circuit 66.

The die casting machine 200 of the second embodiment includes the first pressurizing device 16 and the second pressurizing device 17 in addition to the injection device 14. The first pressurizing device 16 and the second pressurizing device 17 pressurize a molten metal in a region other than the product region of the cavity Ca before the solidification of the molten metal filled in the cavity Ca of the mold 18 progresses.

The injection device 14, the first pressurizing device 16, and the second pressurizing device 17 apply a pressure to the molten metal before solidification progresses at three positions. Thus, since the pressure is more likely to be uniformly transmitted into the molten metal compared to the die casting machine 100 of the first embodiment, cavities can be effectively reduced. Thus, the casting pressure can be further decreased. Thus, it is not necessary to further increase the capacity of the mold clamping device or the injection device and it is possible to decrease the manufacturing cost of the die casting machine.

As described above, according to the second embodiment, since the first pressurizing device 16 and the second pressurizing device 17 are provided, it is possible to realize the die casting machine capable of further decreasing the casting pressure.

Third Embodiment

A die casting machine of a third embodiment is different from the die casting machines of the first embodiment and the second embodiment in that a third pressurizing device is further provided to pressurize a molten metal filled in a cavity in a region other than a product region of the cavity. Hereinafter, some descriptions may be omitted for the contents that overlap with the first embodiment and the second embodiment.

Figure 12A:
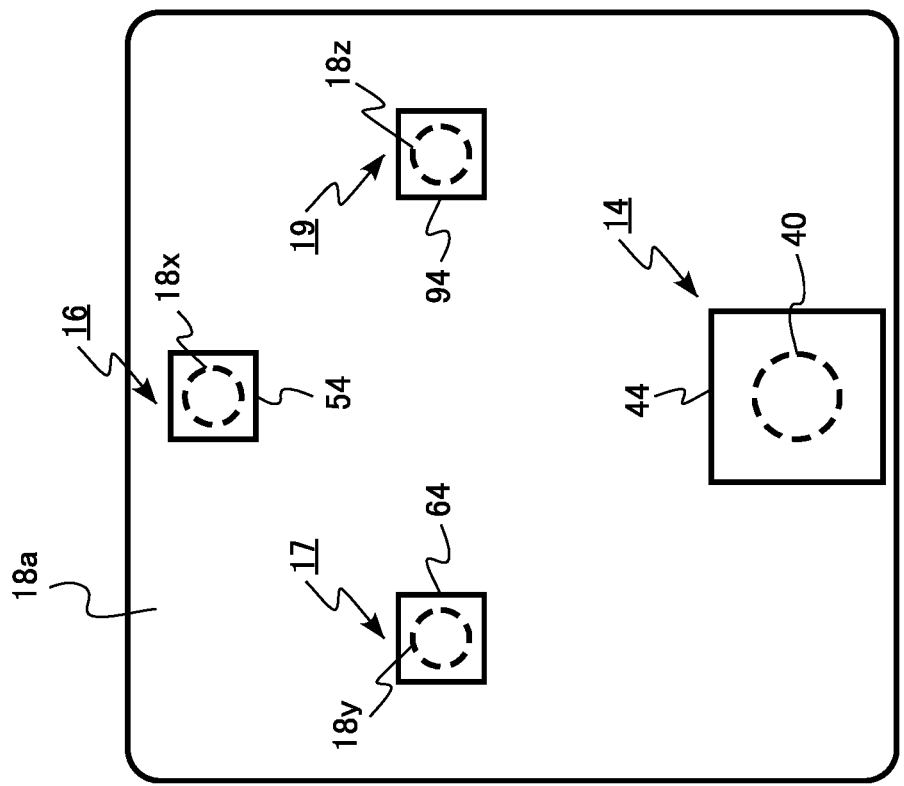
FIG. 12A, FIG. 12B are schematic views including a fixed die of a die casting machine of a third embodiment.
Figure 12B:
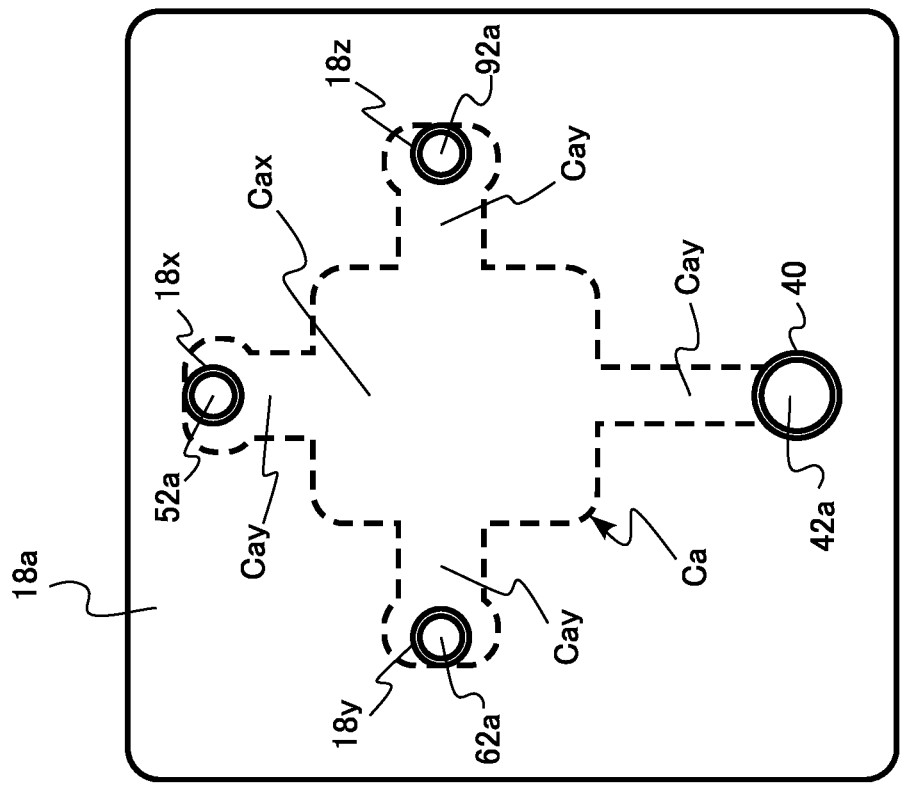

FIG. 12A and FIG. 12B are a schematic view including a fixed die of the die casting machine of the third embodiment. FIG. 12A is a plan view in which a fixed die 18a is viewed from the side of a movable die plate 26. FIG. 12B is a plan view in which a movable die 18b is viewed from the side of a fixed die plate 24.

An injection device 14 includes an injection sleeve 40, an injection plunger 42, an injection actuator 44, a first hydraulic circuit 46, and a position sensor 48. The injection sleeve 40 includes a molten metal supply port 40a. The injection plunger 42 includes an injection plunger tip 42a and an injection plunger rod 42b. The injection actuator 44 includes an injection cylinder 44a, an injection piston 44b, a rod side chamber 44x, and a cap side chamber 44y.

Similarly to the first and second embodiments, a first pressurizing device 16 includes a first pressurizing plunger 52, a first pressurizing actuator 54, a second hydraulic circuit 56, and a first load sensor 58. The first pressurizing plunger 52 includes a first pressurizing plunger tip 52a and a first pressurizing plunger rod 52b. The first pressurizing actuator 54 includes a first pressurizing cylinder 54a, a first pressurizing piston 54b, a first rod side chamber 54x, and a first cap side chamber 54y.

Similarly to the second embodiment, the second pressurizing device 17 includes a second pressurizing plunger 62, a second pressurizing actuator 64, a third hydraulic circuit 66 (third liquid pressure circuit), and a second load sensor 68. The second pressurizing plunger 62 includes a second pressurizing plunger tip 62a and a second pressurizing plunger rod 62b. The second pressurizing actuator 64 includes a second pressurizing cylinder 64a, a second pressurizing piston 64b, a second rod side chamber 64x, and a second cap side chamber 64y.

The third pressurizing device 19 has the same configuration as the first pressurizing device 16 and the second pressurizing device 17. The third pressurizing device 19 includes a third pressurizing plunger, a third pressurizing actuator 94, a third hydraulic circuit (not shown), and a third load sensor (not shown). The third pressurizing plunger includes a third pressurizing plunger tip 92a and a third pressurizing plunger rod (not shown). The third pressurizing actuator 94 includes a third pressurizing cylinder, a third pressurizing piston, a third rod side chamber, and a third cap side chamber (not shown).

For example, a first guide region 18x is provided in a non-product region Cay of the fixed die 18a. The first guide region 18x is, for example, a cylindrical recess provided in the fixed die 18a. Further, a second guide region 18y is provided in another non-product region Cay of the fixed die 18a. The second guide region 18y is, for example, a cylindrical recess provided in the fixed die 18a. Further, a third guide region 18z is provided in still another non-product region Cay of the fixed die 18*a*. The third guide region 18*z* is, for example, a cylindrical recess provided in the fixed die 18*a*.

The second guide region 18*y* and the third guide region 18*z* are provided on the left and right sides of the product region Cax with the product region Cax interposed therebetween. The product region Cax is interposed between the second guide region 18*y* and the third guide region 18*z*.

The first pressurizing actuator 54 of the first pressurizing device 16, the second pressurizing actuator 64 of the second pressurizing device 17, and the third pressurizing actuator 94 of the third pressurizing device are provided, for example, in the fixed die plate 24.

The pressure applied to the molten metal by the second pressurizing device 17 is the third pressure. The pressure applied to the molten metal by the second pressurizing plunger 62 is the third pressure. The third pressure is larger than the first pressure. The third pressure is, for example, 1.1 times or more and 3 times or less the first pressure. The third pressure is smaller than, for example, the second pressure.

The pressure applied to the molten metal by the third pressurizing device 19 is the fourth pressure. The pressure applied to the molten metal by the third pressurizing plunger is the fourth pressure. The fourth pressure is larger than the first pressure. The fourth pressure is, for example, 1.1 times or more and 3 times or less than the first pressure. The fourth pressure is smaller than, for example, the second pressure.

The distance between the second guide region 18*y* and the injection sleeve 40 is smaller than the distance between the first guide region 18*x* and the injection sleeve 40. The distance between the third guide region 18*z* and the injection sleeve 40 is smaller than the distance between the first guide region 18*x* and the injection sleeve 40.

The distance between the second pressurizing plunger tip 62*a* and the injection plunger tip 42*a* is smaller than the distance between the first pressurizing plunger tip 52*a* and the injection plunger tip 42*a*. The distance between the third pressurizing plunger tip 92*a* and the injection plunger tip 42*a* is smaller than the distance between the first pressurizing plunger tip 52*a* and the injection plunger tip 42*a*.

The distance between the second pressurizing device 17 and the injection device 14 is smaller than the distance between the first pressurizing device 16 and the injection device 14. The distance between the third pressurizing device 19 and the injection device 14 is smaller than the distance between the first pressurizing device 16 and the injection device 14.

The die casting machine of the third embodiment includes the first pressurizing device 16, the second pressurizing device 17, and the third pressurizing device 19 in addition to the injection device 14. The first pressurizing device 16, the second pressurizing device 17, and the third pressurizing device 19 pressurize the molten metal in a region other than the product region of the cavity Ca before the solidification of the molten metal filled in the cavity Ca of the mold 18 progresses.

The injection device 14, the first pressurizing device 16, the second pressurizing device 17, and the third pressurizing device 19 apply a pressure to the molten metal before solidification progresses at four positions. Thus, since the pressure is more likely to be uniformly transmitted into the molten metal compared to the die casting machine 100 of the first embodiment and the die casting machine 200 of the second embodiment, cavities can be effectively reduced. Thus, the casting pressure can be further decreased. Thus, it is not necessary to further increase the capacity of the mold clamping device or the injection device and it is possible to decrease the manufacturing cost of the die casting machine.

The third pressure is preferably smaller than the second pressure. In other words, the second pressure is preferably larger than the third pressure.

The fourth pressure is preferably smaller than the second pressure. In other words, the second pressure is preferably larger than the fourth pressure.

The pressure applied by the first pressurizing device 16 located at a position separated from the injection device 14 that injects the molten metal into the product region Cax in relation to the second pressurizing device 17 and the third pressurizing device 19 is increased. As a result, the pressure is more likely to be uniformly transmitted into the molten metal, and the cavities can be effectively reduced. In addition, it is possible to prevent an unnecessary increase in the pressure of the molten metal and the generation of burr.

As described above, according to the third embodiment, since the first pressurizing device 16, the second pressurizing device 17, and the third pressurizing device 19 are provided, it is possible to realize the die casting machine capable of further decreasing the casting pressure.

As described above, the embodiments of the invention have been described with reference to specific examples. However, the invention is not limited to these specific examples. In the embodiments, although the description of the portion of the die casting machine or the like that is not directly required for the description of the invention is omitted, the required elements related to the die casting machine or the like can be appropriately selected and used.

In the first embodiment, an example of a case in which the first pressurizing actuator 54 of the first pressurizing device 16 is provided in the fixed die plate 24 has been described, but the first pressurizing actuator 54 may be provided, for example, in the movable die plate 26, the fixed die 18*a*, the movable die 18*b*, or the other portions. The same applies to the installation positions of the second pressurizing actuator 64 of the second embodiment and the second pressurizing actuator 64 and the third pressurizing actuator 94 of the third embodiment.

In the first embodiment, an example of a case in which the first pressurizing plunger 52 is provided in the fixed die 18*a* has been described, but the first pressurizing plunger 52 may be provided in the movable die 18*b*. The same applies to the installation positions of the second pressurizing plunger 62 of the second embodiment and the second pressurizing plunger 62 and the third pressurizing plunger of the third embodiment.

A case in which two pressurizing devices are provided as the first pressurizing device 16 and the second pressurizing device 17 is exemplified in the second embodiment and a case in which three pressurizing devices are provided as the first pressurizing device 16, the second pressurizing device 17, and the third pressurizing device 19 is exemplified in the third embodiment. However, four or more pressurizing devices can be also provided.

In addition, all die casting machines having the elements of the invention and appropriately redesigned by those skilled in the art are included in the scope of the invention. The scope of the invention is defined by the scope of claims and the scope of their equivalents.

What is claimed is:

1. A die casting machine comprising:
   a base;
   a fixed die plate fixed onto the base and holding a fixed die;

a movable die plate provided on the base, the movable die plate configured to move in a mold opening and closing direction, and the movable die plate holding a movable die to face the fixed die;

an injection device configured to fill a molten metal into a cavity formed by the fixed die and the movable die, and the injection device configured to apply a first pressure to the molten metal, the injection device comprising:
  an injection sleeve connected to the cavity,
  an injection plunger slidably disposed in the injection sleeve and configured to apply the first pressure to the molten metal,
  an injection actuator configured to move the injection plunger, and
  a first liquid pressure circuit configured to drive the injection actuator, wherein the first liquid pressure circuit includes a first valve configured to control a flow of a first hydraulic liquid flowing in the first liquid pressure circuit and a first accumulator configured to increase a flow rate of the first hydraulic liquid;

a first pressurizing device configured to pressurize the molten metal filled in the cavity in a region other than a product region of the cavity and configured to apply a second pressure to the molten metal, the first pressurizing device comprising:
  a first pressurizing plunger configured to apply the second pressure to the molten metal,
  a first pressurizing actuator configured to move the first pressurizing plunger, and
  a second liquid pressure circuit configured to drive the first pressurizing actuator, wherein the second liquid pressure circuit includes a second valve configured to control a flow of a second hydraulic liquid flowing in the second liquid pressure circuit and a second accumulator configured to increase a flow rate of the second hydraulic liquid; and a control device configured to control the first pressurizing device so that the second pressure becomes higher than the first pressure.

2. The die casting machine according to claim 1,
wherein the first liquid pressure circuit includes a first back pressure absorbing cylinder configured to increase a flow rate of the first hydraulic liquid, and
wherein the second liquid pressure circuit includes a second back pressure absorbing cylinder configured to increase a flow rate of the second hydraulic liquid.

3. The die casting machine according to claim 1,
wherein the first valve and the second valve are servo valves.

4. The die casting machine according to claim 1,
wherein the second liquid pressure circuit includes a first liquid pressure sensor provided on a pressurization side of the first pressurizing actuator and a second liquid pressure sensor provided on a back pressure side of the first pressurizing actuator, and
wherein the control device is configured to control the second pressure based on measurement values of the first liquid pressure sensor and the second liquid pressure sensor.

5. The die casting machine according to claim 1,
wherein the second liquid pressure circuit includes a short-circuit flow path short-circuiting a pressurization side and a back pressure side of the first pressurizing actuator and a degassing valve provided in the short-circuit flow path configured to extract a gas contained in the second hydraulic liquid.

6. The die casting machine according to claim 1,
wherein the second liquid pressure circuit includes a flow rate sensor configured to measure a flow rate of the second hydraulic liquid and the control device is configured to control a speed of the first pressurizing plunger based on a measurement value of the flow rate sensor.

7. The die casting machine according to claim 1,
wherein the second pressure is 1.1 times or more and 3 times or less than the first pressure.

8. The die casting machine according to claim 1,
wherein the control device is configured to control the first pressurizing device so that the molten metal starts to be pressurized within 10 msec after the filling of the molten metal into the cavity is completed.

9. A die casting machine comprising:
a base;
a fixed die plate fixed onto the base and holding a fixed die;
a movable die plate provided on the base, the movable die plate configured to move in a mold opening and closing direction, and the movable die plate holding a movable die to face the fixed die;
an injection device configured to fill a molten metal into a cavity formed by the fixed die and the movable die, and the injection device configured to apply a first pressure to the molten metal, the injection device comprising:
  an injection sleeve connected to the cavity,
  an injection plunger slidably disposed in the injection sleeve and configured to apply the first pressure to the molten metal,
  an injection actuator configured to move the injection plunger, and
  a first liquid pressure circuit configured to drive the injection actuator;
a first pressurizing device configured to pressurize the molten metal filled in the cavity in a region other than a product region of the cavity and configured to apply a second pressure to the molten metal, the first pressurizing device comprising:
  a first pressurizing plunger configured to apply the second pressure to the molten metal,
  a first pressurizing actuator configured to move the first pressurizing plunger, and
  a second liquid pressure circuit configured to drive the first pressurizing actuator; and
a control device configured to control the first pressurizing device so that the second pressure becomes higher than the first pressure;
wherein the first pressurizing actuator is provided in the fixed die plate and the first pressurizing plunger is provided in the fixed die.

10. A die casting machine comprising:
a base;
a fixed die plate fixed onto the base and holding a fixed die;
a movable die plate provided on the base, the movable die plate configured to move in a mold opening and closing direction, and the movable die plate holding a movable die to face the fixed die;
an injection device configured to fill a molten metal into a cavity formed by the fixed die and the movable die, and the injection device configured to apply a first pressure to the molten metal;

a first pressurizing device configured to pressurize the molten metal filled in the cavity in a region other than a product region of the cavity and configured to apply a second pressure to the molten metal;
a second pressurizing device configured to pressurize the molten metal filled into the cavity in a region other than the product region of the cavity and configured to apply a third pressure to the molten metal; and
a control device configured to control the first pressurizing device so that the second pressure becomes higher than the first pressure and configured to control the second pressurizing device so that the third pressure becomes higher than the first pressure.

11. The die casting machine according to claim 10, wherein the second pressurizing device includes a second pressurizing plunger configured to apply the third pressure to the molten metal, a second pressurizing actuator configured to move the second pressurizing plunger, and a third liquid pressure circuit configured to drive the second pressurizing actuator.

12. The die casting machine according to claim 10, wherein a distance between the second pressurizing device and the injection device is smaller than a distance between the first pressurizing device and the injection device, and
wherein the control device is configured to control the first pressurizing device and the second pressurizing device so that the second pressure becomes higher than the third pressure.

* * * * *